July 19, 1966 H. A. STOVER 3,262,117
DIGITAL OMNIRANGE SYSTEM OF HIGHER ACCURACY THAN
EXISTING OMNIRANGE SYSTEMS
Filed Oct. 14, 1963 12 Sheets-Sheet 1

INVENTOR.
HARRIS A. STOVER
Moody & Anderson
AGENTS

July 19, 1966

H. A. STOVER 3,262,117

DIGITAL OMNIRANGE SYSTEM OF HIGHER ACCURACY THAN
EXISTING OMNIRANGE SYSTEMS

Filed Oct. 14, 1963

INVENTOR.
HARRIS A. STOVER

BY Moody & Anderson

AGENTS

July 19, 1966

H. A. STOVER 3,262,117

DIGITAL OMNIRANGE SYSTEM OF HIGHER ACCURACY THAN
EXISTING OMNIRANGE SYSTEMS

Filed Oct. 14, 1963

INVENTOR.
HARRIS A. STOVER

BY

AGENTS

INVENTOR.
HARRIS A. STOVER
BY
*Moody & Anderson*
AGENTS

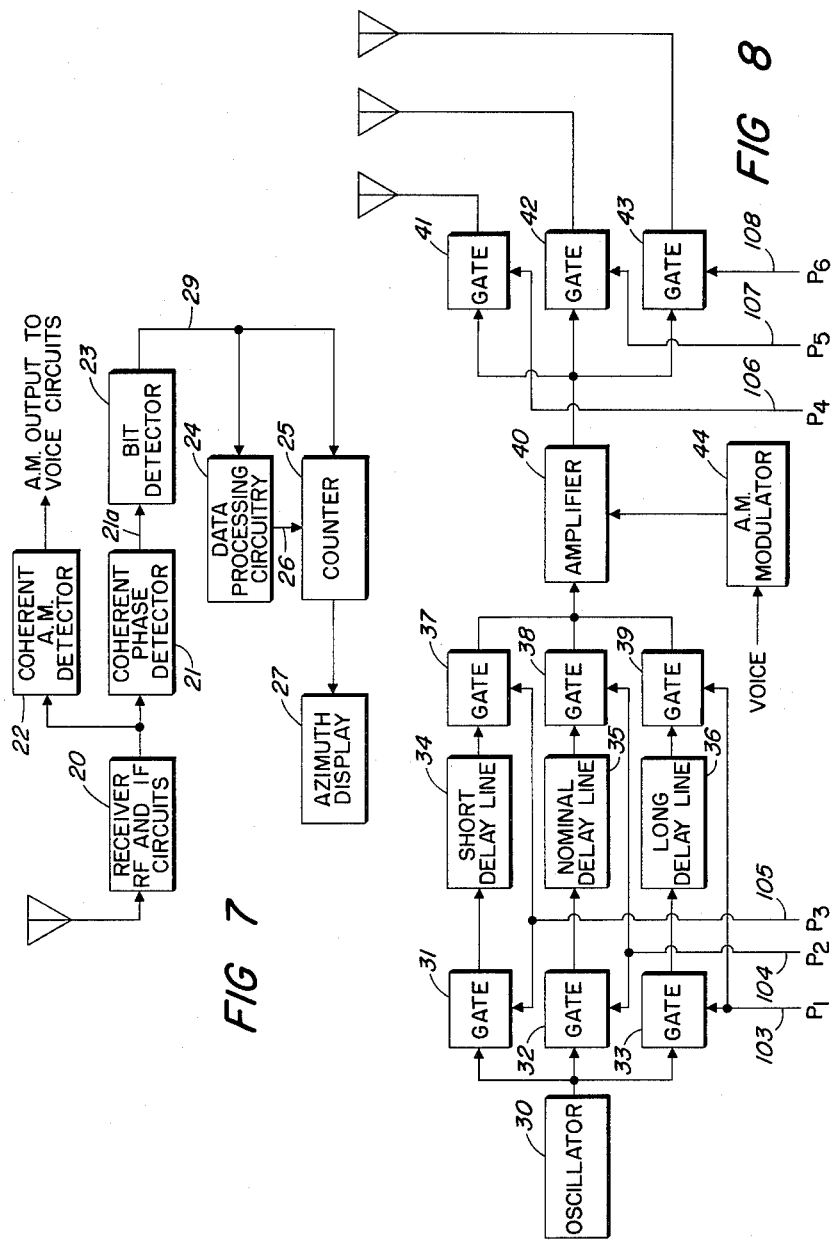

| TRANSMITTER SEQUENCE PERIODS | GATE SWITCHING VOLTAGES (X) | | | | | |
|---|---|---|---|---|---|---|
| | P1 LONG DELAY | P2 NOMINAL DELAY | P3 SHORT DELAY | P4 ANTENNA A | P5 ANTENNA B | P6 ANTENNA C |
| ALTERNATING BETWEEN A AND C | | X | | X ⇄ | | X |
| REFERENCE PHASE FROM B | X ⇄ X | | | | X | |
| CODE 1 ON B | X ⇄ X | | | | X | |
| CODE 2 ON B | X ⇄ X | | | | X | |
| CODE 3 ON B | X ⇄ X | | | | X | |
FIG 10
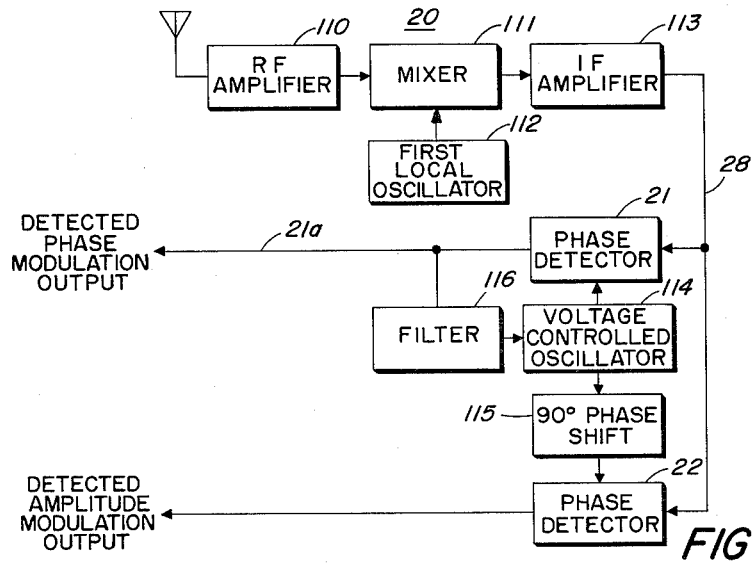
FIG 11
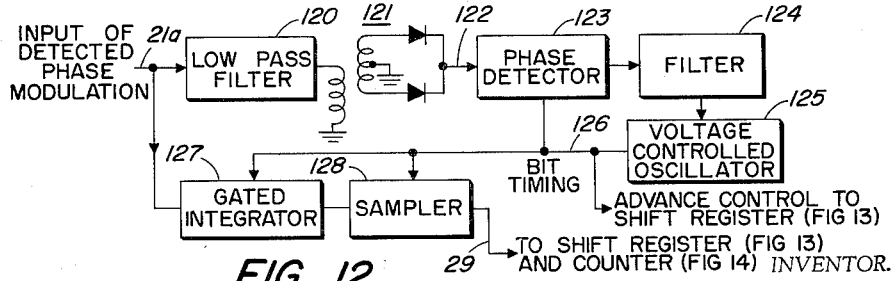
FIG 12
INVENTOR.
HARRIS A. STOVER
BY
Moody & Anderson
AGENTS July 19, 1966 H. A. STOVER 3,262,117
DIGITAL OMNIRANGE SYSTEM OF HIGHER ACCURACY THAN
EXISTING OMNIRANGE SYSTEMS
Filed Oct. 14, 1963 12 Sheets-Sheet 12

INVENTOR.
HARRIS A. STOVER
BY
Moody & Anderson
AGENTS

United States Patent Office 3,262,117
Patented July 19, 1966

3,262,117
DIGITAL OMNIRANGE SYSTEM OF HIGHER ACCURACY THAN EXISTING OMNIRANGE SYSTEMS
Harris A. Stover, Cedar Rapids, Iowa, assignor to Collins Radio Company, Cedar Rapids, Iowa, a corporation of Iowa
Filed Oct. 14, 1963, Ser. No. 315,899
20 Claims. (Cl. 343—106)

This invention relates generally to omnirange navigation systems and more particularly to an omnirange navigation system employing phase modulation and in which the angle between a receiving station and a transmitting site is determined digitally.

Two omnirange systems are presently employed in the art. The first of these systems might be termed the conventional variable omnirange system (VOR) wherein a 30% amplitude modulation of a transmitted pattern is obtained by a rotating antenna pattern and reference data is transmitted on a 9.96 kc. subcarrier frequency modulated at a 30 c.p.s. rate with a maximum deviation of 480 c.p.s. The subcarrier is 30% amplitude modulated on a transmitted carrier. The phase relationship between the 30 c.p.s. amplitude modulation and the 30 c.p.s. reference F.M. modulation of the subcarrier is measured and used to provide the indication of the direction of the receiver from the transmitter site. The conventional VOR system is limited by the extent to which the phase relationship between two sinusoidal waves can be determined. Error is introduced due to site errors introduced by land contours and/or objects near the transmitting site which produce distortion in the antenna pattern which produces the A.M. modulation. The receiver thus may develop a distorted sine wave for phase comparison purposes and the degree of discrepancy between this sine wave and a true sine wave introduces phase measuring errors and thus errors in the azimuth indication.

The errors present in the conventional omnirange system are considerably overcome by the second type of omnirange system currently in use wherein doppler techniques are employed. In the doppler omnirange system the reference signal is transmitted by applying 30 c.p.s. A.M. modulated signal to a fixed antenna. A variable phase signal is produced by applying a further signal which differs from the reference A.M. modulated signal by 9.96 kc. to an antenna which effectively rotates about the fixed antenna at a 30 r.p.s. rate. The beat between the two carriers in the receiver produces a 9.96 kc. subcarrier which appears frequency modulated at a 30 c.p.s. rate due to the doppler effect of the moving antenna. This 9.96 kc. subcarrier is thus compatible with that of the conventional system although produced by a different method. The relative phase of the F.M. modulation signal compared to the reference A.M. modulation is dependent upon the direction of the receiver from the transmitter site. The doppler omnirange system has reduced site errors since it is not dependent upon the shape of an antenna radiation pattern that may be distorted by nearby objects. The doppler system, however, is still limited in accuracy by the extent to which the phases between two sinusoidal waves may be precisely measured.

As in the conventional system, any distortion of the two sine waves which are compared appears as apparent phase shift and hence produces an error in the azimuth indication.

Each of the currently used systems is further subject to error due to nonlinearity in amplifiers and frequency discriminators. Further, errors may occur in resolvers and other electromechanical devices utilized in making the necessary phase comparisons. These errors may be reduced only by elaborate and expensive design and it generally becomes impractical to reduce them to extremely low values.

It is an object, therefore, of the present invention to provide an omnirange navigation system in which amplitude modulation is not employed and in which the navigation angle is not a function of the relative phases of two sine waves, but is determined digitally.

A further object of the present invention is the provision of a digital omnirange system employing phase modulation measurement techniques on a digital basis and wherein the simultaneous transmission of voice or other information on the transmitted carrier is allowed.

The present invention is featured in a system employing a fixed antenna for reference purposes and a pair of rotating antennas lying on a line passing through the fixed antenna site and caused to rotate about the fixed antenna at a predetermined rate in conjunction with a switching means for switching the carrier frequency at a predetermined rate among the fixed and rotating antennas. A receiver, including appropriate logic circuitry, utilizes information bits in the form of sequential phase changes as a function of the antenna rotation rate and transmitting switching rate to digitally display the azimuth between the receiver and the antenna site as measured from a predetermined reference azimuth.

The present invention will become apparent upon reading the following description in conjunction with the accompanying drawings in which;

FIGURES 1a, 1b, and 1c are diagrammatic representations of the operating principles of the embodiment of the invention;

FIGURE 2 is a diagrammatic representation illustrating the transmission sequence of a further embodiment of the present invention;

FIGURES 3a, 3b, and 3c are diagrammatic representations showing the principles of operation of a system in accordance with the embodiment of FIGURE 2;

FIGURES 4a, 4b, and 4c represent further diagrammatic operating principles of a system embodied in accordance with FIGURE 2;

FIGURE 7 is a functional diagram of the receiver portion of the present invention;

Figure 9A:
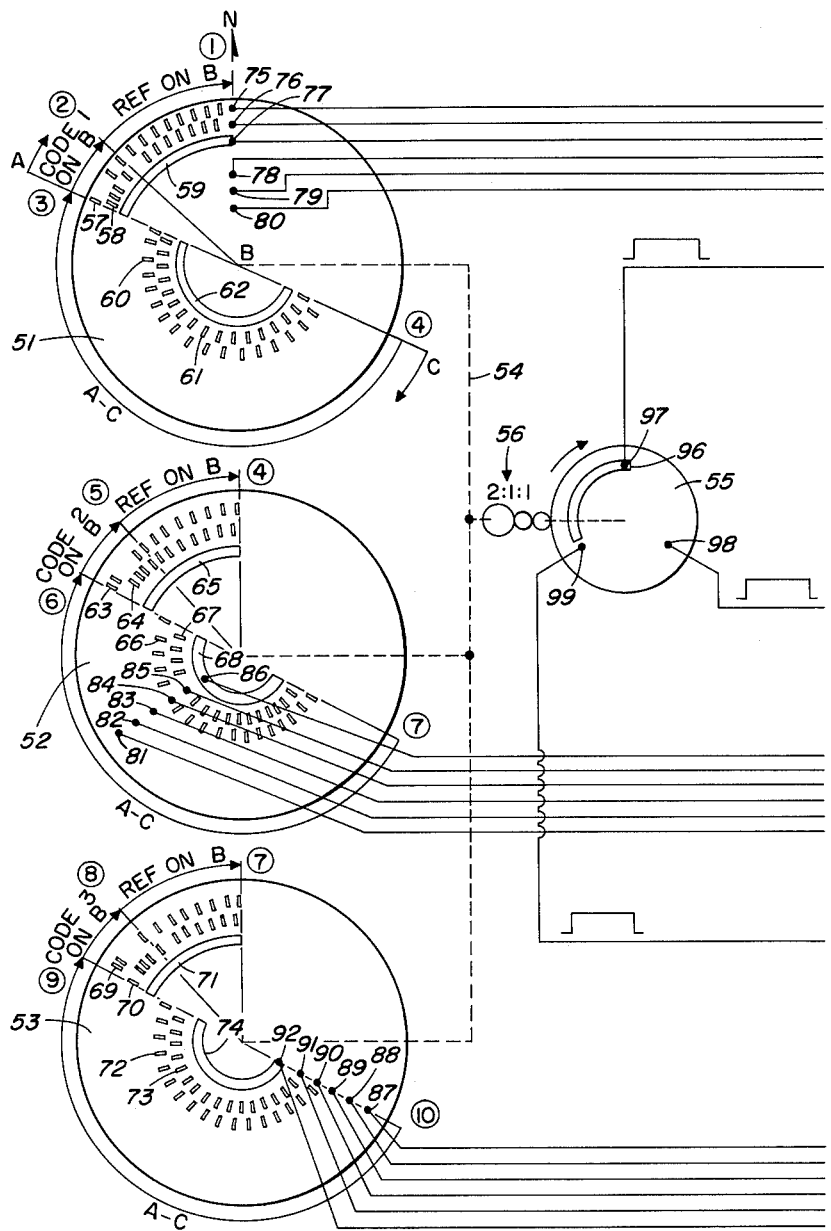
Figure 9B:
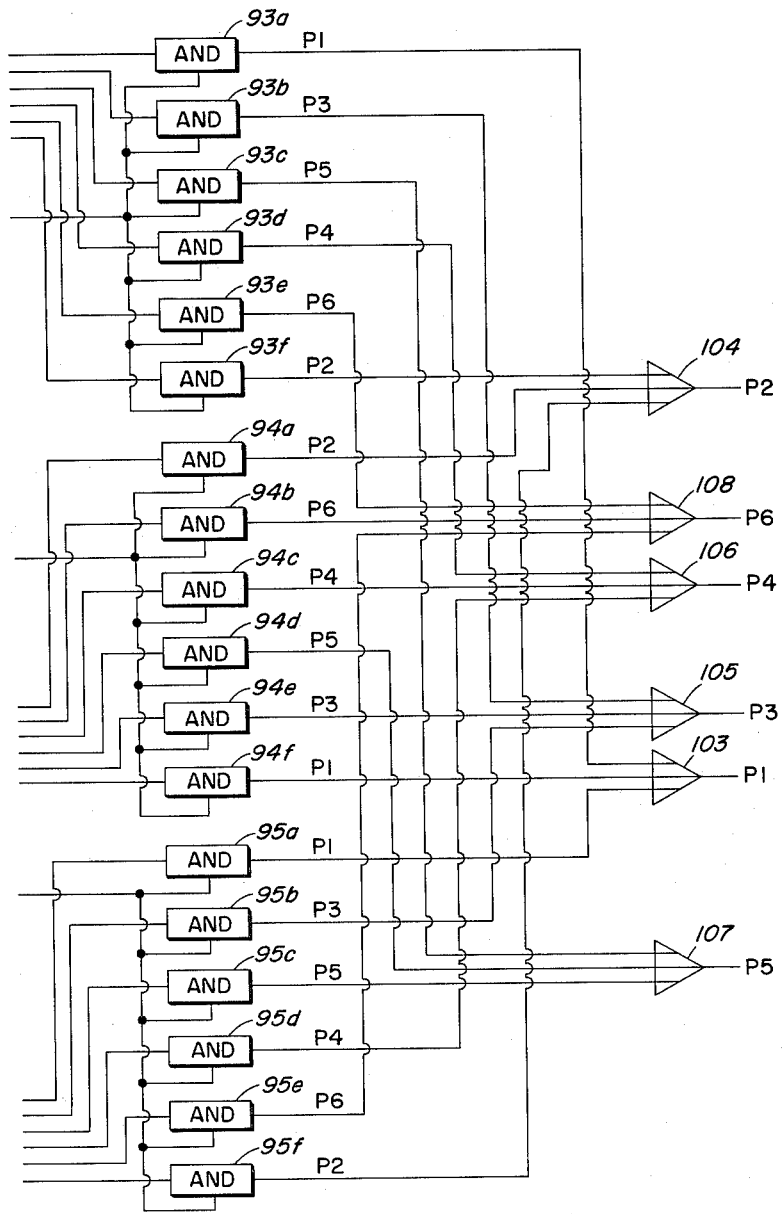
Figure 13:
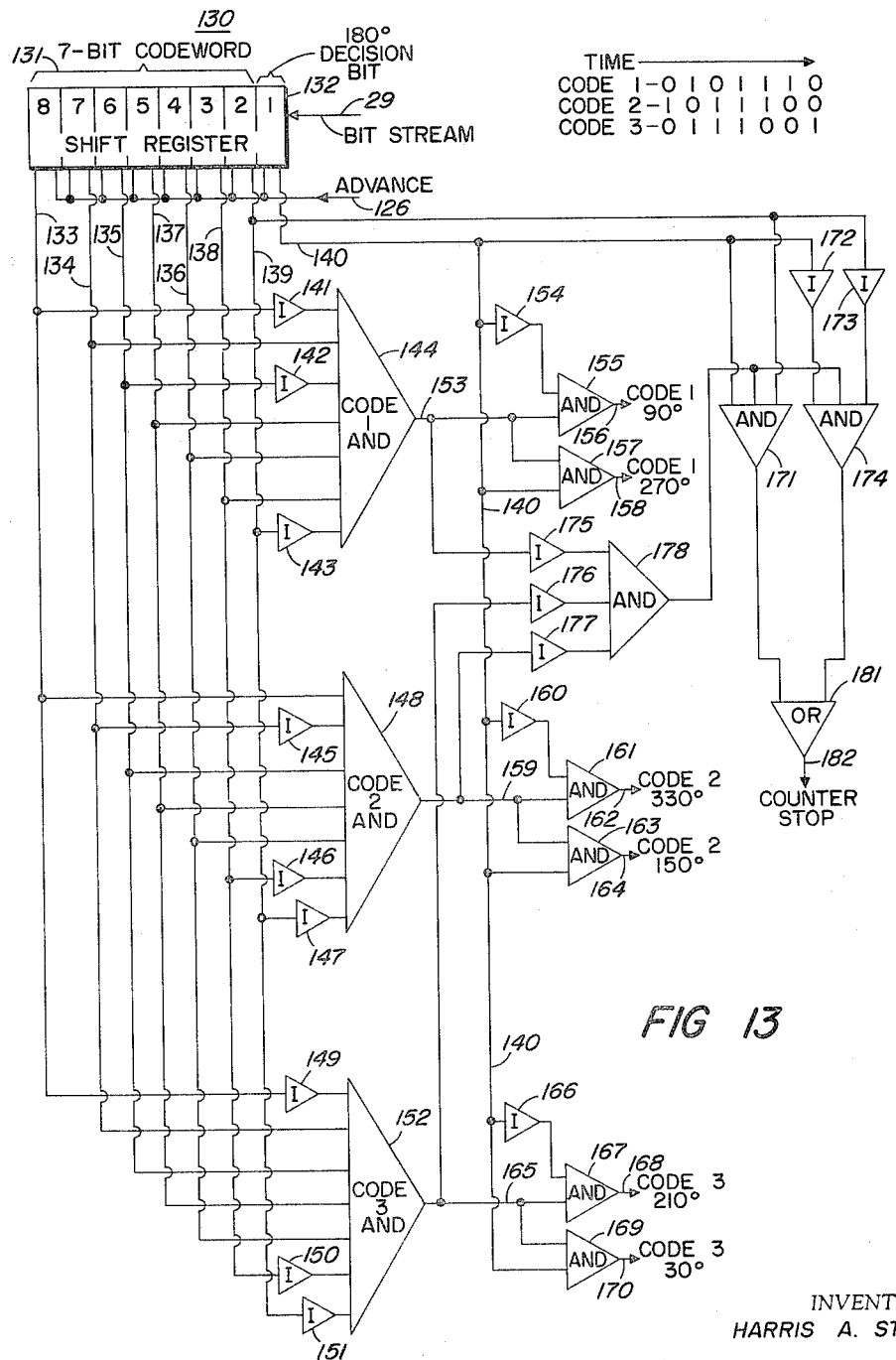
Figure 14:
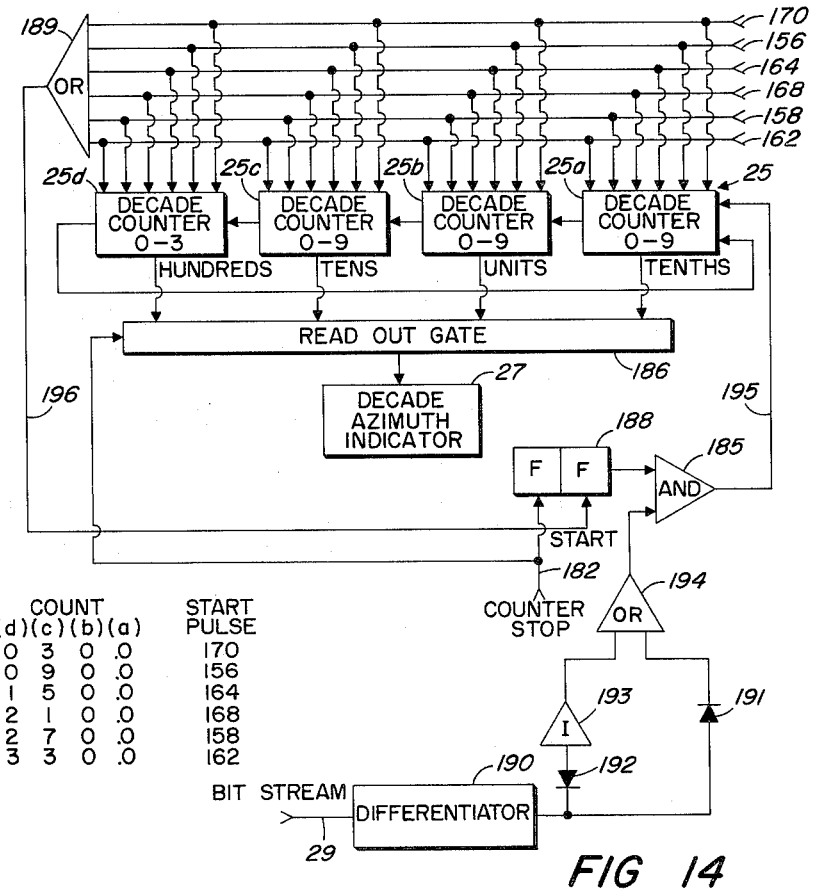
Figure 15:
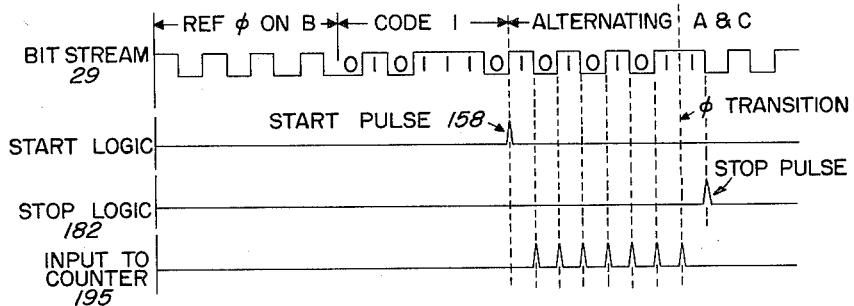

FIGURES 8, 9a, and 9b constitute a more detailed block diagram of a transmitter embodiment;

FIGURE 10 is a diagrammatic representation of transmitter gating requirements;

FIGURES 11-14 are more detailed block diagrams of a receiver embodiment in accordance with the present invention;

FIGURE 15 depicts operational wave forms of the receiver embodiment of FIGURES 11-14.

The present invention will first be described in terms of the operating principles involved, that is, in terms of the transmitting sequence and switching technique which provides the digital basis for ultimate angle indication at the receiving site.

Figure 1A:
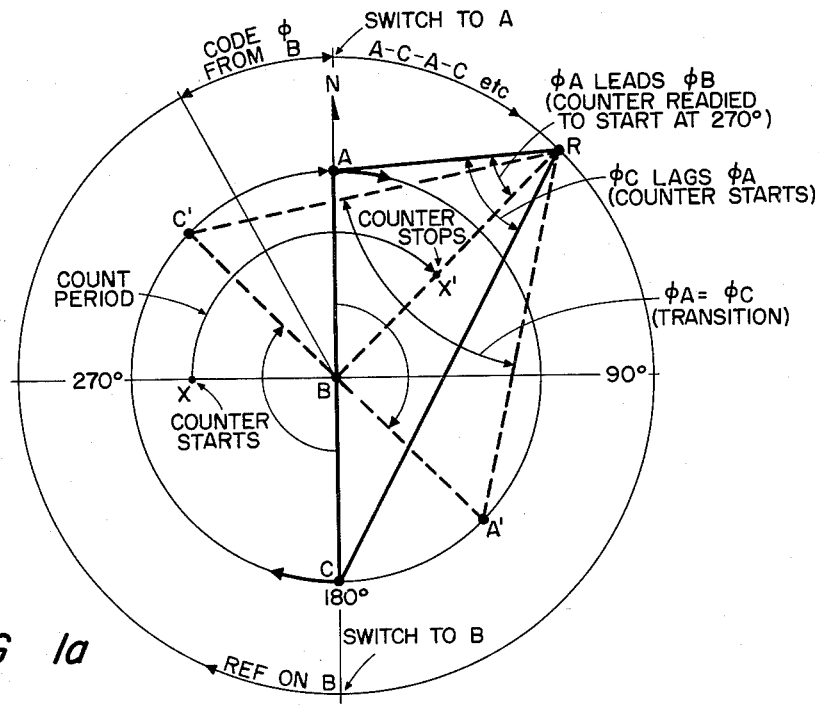

With reference to FIGURE 1A, the system might first be described in terms of the physical characteristics of a transmitting site. The transmitting system consists of three individual antennas A, B and C. Antenna B is a fixed antenna located on a line between antennas A and C. Antennas A and C are caused to rotate in space about antenna B and are separated by not more than one-half wave length at the operating carrier frequency. For the purpose of this description, let it be assumed that antennas A and C make one complete revolution each second about the fixed antenna B. Now, consider that the transmitter is switched alternately between antennas A and C at a switching rate of 3600 times per second. With these considerations, if the antenna system were stopped in the position illustrated in FIGURE 1A, the switching between antennas A and C would cause a shift in the relative phase of the transmitted signal as received at a receiver site R, unless the receiver R were located on a perpendicular bisector of the line between antennas A and C. This phase shift is inherent from the geometry of the system in that antenna A is closer to the receiver site R than is antenna C in the position illustrated. Now, considering that the antennas A and C rotate in a clockwise direction, it is seen that the receiver receives alternate bits or intervals of received signal from antennas A and C which respectively lead and lag a reference phase as would be transmitted from antenna B. The direction of the phase shift of the signal from antennas A and C as compared to the reference phase from antenna B depends upon whether the receiving station R lies above the prependicular bisector of the line between antennas A and B or below it. There is thus a transition in the phase characteristics when the perpendicular bisector between antennas A and B is moved through the receiving location as the antennas rotate. This principle then establishes the properties of the antenna system in accordance with the present invention from which azimuth may be determined. The reference phase is established using antenna B on a time sharing basis with antennas A and C, since antenna B remains a constant distance from the receiver site.

It is noted then that the present system establishes a phase measuring technique wherein phase information is not determined as a function of the phase displacement between two sinusoidal waves. The system establishes a sequence of information bits in the form of opposite phase shifts of transmitted carrier waves at the receiver site when compared to a reference phase which is independent of azimuth and/or position of the rotatable antennas. The entire system, then, becomes a digital system which operates at a bit rate determined by the rate of switching between antennas A and C. Generally speaking, the receiver establishes phase locking when the transmission is from the fixed antenna B; starts a digital counter at a predetermined reference azimuth as concerns the rotating antennas; and monitors the alternate phase shifts of the transmissions from antennas A and C until such time as the perpendicular bisector between antennas A and B passes through the receiver site, at which time a phase characteristic transition is encountered and appropriate logic is employed to stop the counter. A readout system may be employed to transfer the count from the counter to a digital indicator.

The general characteristics of the navigation system of this invention, as described above, may best be comprehended by a consideration of the electrical and geometrical sequence of events at the transmitter site.

FIGURE 1A illustrates, in diagrammatic fashion, a sequence of events between transmitter and receiver for the purpose of clarifying the operating principle. With reference to FIGURE 1A, let it be assumed that once during each measurement sequence (which for the time will be considered one complete revolution of antennas A and C about the fixed antenna B) that a transmitter is connected to antenna B, and that the receiver at R has established phase locking with the carrier transmitted from antenna B. From a time standpoint, this period might be that dominating the half-revolution period of the antenna system prior to that illustrated; that is, when antenna A is rotated from an azimuth of 180° towards 0° in a clockwise direction. Just prior to antenna A being aligned at 0° azimuth as illustrated, consider that the transmitter, still connected to antenna B, is phase modulated with a short binary pattern; for example, a short pseudo random sequence. The receiver R may now recognize the transmitted binary pattern so as to establish a phase reference. In the illustration of FIGURE 1, this phase reference is noted to be 0° or true north. Now consider, as antenna A reaches the true north or reference position, as illustrated in FIGURE 1, that the transmitter is switched to antenna A. At this period of time the receiver at R, having established a phase reference from the previous transmission sequence from fixed antenna B, will note a positive phase shift since antenna A is nearer the receiver R than is B; that is to say, distance RA is less than distance RB and thus, the phase of the signal received from the transmitter A at the position illustrated would lead that of the previously received reference from B. It might be noted at this time that the particular phase relationship between the transmission from A and the reference established from B is a positive phase shift when the receiver R is above the perpendicular bisector of the line between antennas A and B, and correspondingly would be a negative phase shift (A lagging B), should the receiver location be below the perpendicular bisector of the line between antennas A and B.

The transmission sequence is controlled time-wise by the particular location of antenna A with respect to the phase reference, which, in the illustrated embodiment, is chosen as 0° or true north. It is to be emphasized that the notation of the transmission sequence shown in the outer circle of FIGURE 1A is with reference to the position of antenna A on a time basis.

Considering this transmission sequence, let us assume that the transmission is transferred from antenna B to antenna A at the conclusion of the phase coded reference transmission from antenna B; the latter occurring for a period of time before antenna A reaches the reference azimuth, or 0°.

When a transmission shift is made to A at the indicated position of antenna A, the receiver at R measures a positive phase shift (A leading B) at the time of the switch to A. Let it be now assumed, in response to the positive phase shift at the instant of switching to antenna A subsequent to the phase coded reference transmission to B, that an azimuth counter is readied to start a count from 270°. This is indicated diagrammatically by point X on the 270° azimuth line of FIGURE 1A. As antenna A reaches the north reference the transmission sequence is that of alternately switching between antennas A and C and thus, with the antenna rotating one revolution per second and the transmitter being switched between antennas A and C at the rate of 3600 times per second, there is a phase shift (alternating, plus and minus) at the receiver every 0.1° of rotation of the antenna system. The counter is arranged to count these phase shifts (the "phase shifts" here referring to the relative phase (leading or lagging) between the transmissions from A and C as compared with the established reference phase from B). Therefore, the counter is caused to advance one count for each successive phase shift until there are two successive bit periods alike; that is, until there fails to be a shift between 0.1° segments. The two successive like bit periods occur at what was previously described as a phase transition point which occurs when the perpendicular bisector of the line between antennas A and C passes through the receiver site. FIGURE 1A illustrates the situation in diagrammatic form. At the beginning of the sequence, antennas A and B are aligned with the north reference position such that, at the time the transmission is switched to A, the receiver determines that $\phi_a$ leads $\phi_b$ and thus readies the counter to start at 270°. During the ensuing bit, when the transmission is switched to antenna C, $\phi_c$ lags $\phi_a$ and the counter advances one count for each transmission bit as the transmitter is alternately switched from antenna A to antenna C. Now, when the antennas rotate to the indicated positions A' and C', it is noted that the perpendicular bisector BR between antennas A and C is passed through the receiver site at R. Once past this position in a clockwise direction it is noted that the phase of A and C are reversed as compared to the reference B, since the distance RC' will then exceed the distance RA'. Due to this phase transition, the receiver encounters two successive bits during which there is no phase shift. At this point the counter is caused to stop and will have counted during the rotation interval indicated in FIGURE 1A from the initial point X at 270° to the point X' which is noted to be the azimuth of the receiver from the north reference.

Figure 1B:
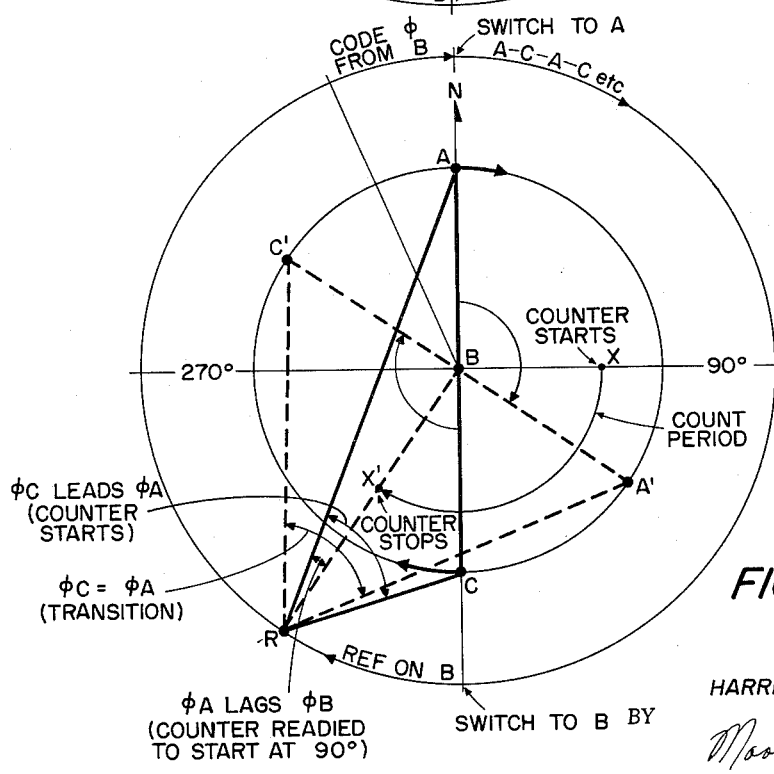

Reference is now made to FIGURE 1B which illustrates diagrammatically the operational characteristics of the system when the receiver site lies beneath the perpendicular bisector of the line between antennas A and B. It is noted that at the conclusion of the phase reference transmission from antenna B and the switching of the transmission to antenna A at the north reference, the distance RA exceeds that of the distance RB and thus $\phi_a$ lags $\phi_b$, whereas in FIGURE 1A it is noted that $\phi_a$ leads $\phi_b$. The receiver may then incorporate logic in response to this lagging phase condition to ready the counter to start from 90° (from the point X in FIGURE 1B). Now, considering that the antenna system rotates to the broken line position (to positions A' and C') it is again noted that the phase transition occurs as the perpendicular bisector BR passes through the receiver site at R to stop the counter which will then have counted from the initial 90° count to the azimuth of receiver R at point X'.

Figure 1C:
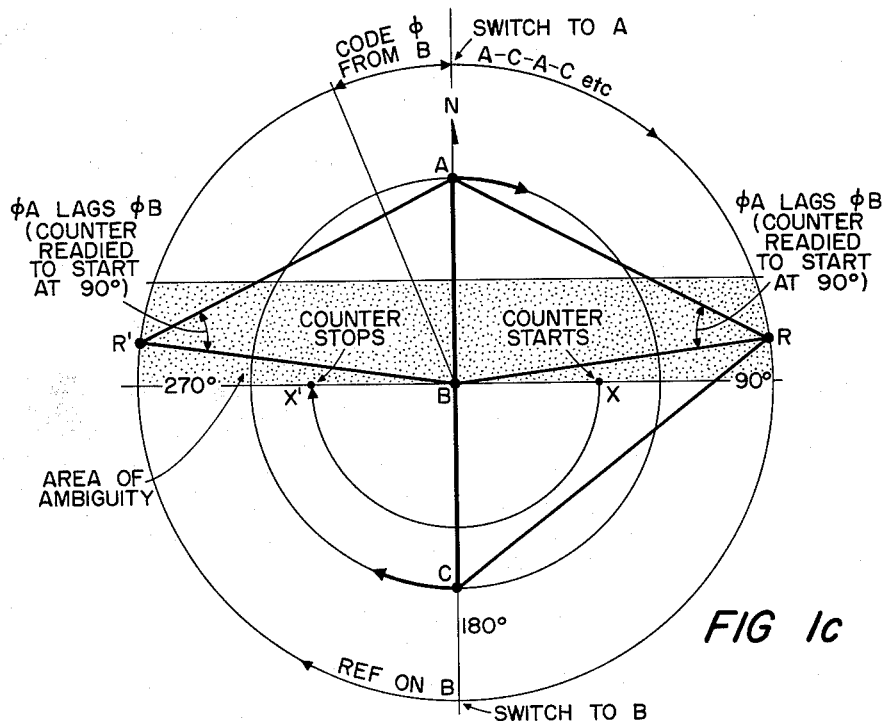

In either of the examples of FIGURE 1A or 1B, a complete count is made for each revolution of the system and is completed within 180° from the starting count. Counter start logic, as determined by the relative phase between the transmission from A and that established from B is seen to determine the azimuth at which the counter is caused to start its count, and thus what might be an ambiguity of 180° is obviated. The embodiment of FIGURE 1, however, is not without ambiguity. The manner in which this ambiguity is encountered, and a consideration of how the system is, from a practical standpoint, operational in spite of the ambiguity, may be comprehended from a consideration of the situation illustrated in FIGURE 1C. FIGURE 1C illustrates receiver locations R and R' which lie between the perpendicular bisector of the line between antennas A and B and the radial defined by the north reference ±90°. First considering a receiver location at R, from previous considerations it is noted that at the time transmission is switched to A, the receiver indicates that $\phi_a$ lags the reference phase $\phi_b$ and thus, in accordance with the aforedescribed counter starting logic, the counter is readied to start at 90°. In this situation, the counter, in accordance with the operation described, would continue counting for the maximum count of 180° to indicate 270° as the azimuth. This azimuth is, of course, ambiguous. Now, considering the receiver to be located at R', it is noted that the initial phase comparison between A and B is likewise that of $\phi_a$ lagging $\phi_b$, and again the counter would be ready to start at 90° in accordance with the aforedescribed counter start logic. Here again, the counter would count to a maximum count of 180° and indicate 270° as the azimuth. It is important to note that the system is defined such that the maximum distance between antennas B and A would be one-quarter wave length at the system frequency and thus the width of the shaded area in FIGURE 1C, which might be termed the "ambiguity corridor," would be less than one-eighth wave length. The system is therefore deemed to be operational in spite of this ambiguity since, when considering an airborne system and wavelengths of only a few feet, the receiver would normally not remain within this narrow ambiguity corridor due to normal drift and wind buffeting. It is to be further emphasized that this ambiguity corridor is not angular in nature, and hence does not increase in width with distance, but remains a narrow corridor extending radially outwardly from the transmitter site.

One further ambiguity might be encountered should the receiver site R lie within the area during which the phase coding is being transmitted from antenna B. This ambiguity would not negate the system from an operational standpoint since, as will be further described, the period during which the phase coding would be transmitted would comprise consecutive 0.1° bit intervals, the sum of which would correspond to less than one degree of azimuth.

The above described operational sequence may then be generally reiterated as follows: The counter starts at the azimuth determined by the reference azimuth ±90°, depending on whether $\phi_a$ lags or leads $\phi_b$ at the time the transmission is switched to A at the conclusion of the reference coded transmission from B. If the receiver site lies on an azimuth within the "corridor" defined by the perpendicular bisector of the line between antennas A and B and the line defined by the phase reference azimuth ±90°, a 180° ambiguity may be encountered since $\phi_a$ will always lag $\phi_b$ and the counter will proceed for a full count of 180° from the starting azimuth defined by the reference phase angle +90°. If the receiver site lies on the reference azimuth ±90° radial, the counter will start but the 180° starting point decision would be ambiguous (random). The width of the ambiguity corridor in an operating system is less than one-eighth wave length at the operating frequency and thus, from an operational standpoint, the system is not seriously impaired by this acknowledged ambiguity. A further preferred embodiment employing multiple counter start logic will be seen to obviate even these minor ambiguitites.

The above description indicates that the count is complete by the time the antenna system has revolved 180° from the point where the counting started, so that except for the period of time that the transmission is connected to antenna B for the transmission of the phase modulated code, the ensuing 180° of antenna rotation might be considered wasted from a measurement standpoint. With the system thus described the counter counts to the receiver azimuth once during each revolution of the system and may thus read out azimuth to an indicator once each second. A preferred embodiment will now be described wherein time is better utilized by making more than one count per revolution of the antenna system and by which the above mentioned ambiguities may be obviated by employing a more sophisticated counter start logic in the form of a plurality of discrete reference phase coded transmissions so as to establish a reoccurring sequence of references from which the counter may be caused to start a count. Further description will show that should one count in a sequence fall into ambiguities as aforedescribed, the next count in a sequence will not be so affected. Therefore, logic might be employed to "reject" any drastic change in count, on, for example, a consistent "two out of three" basis.

Figure 2:
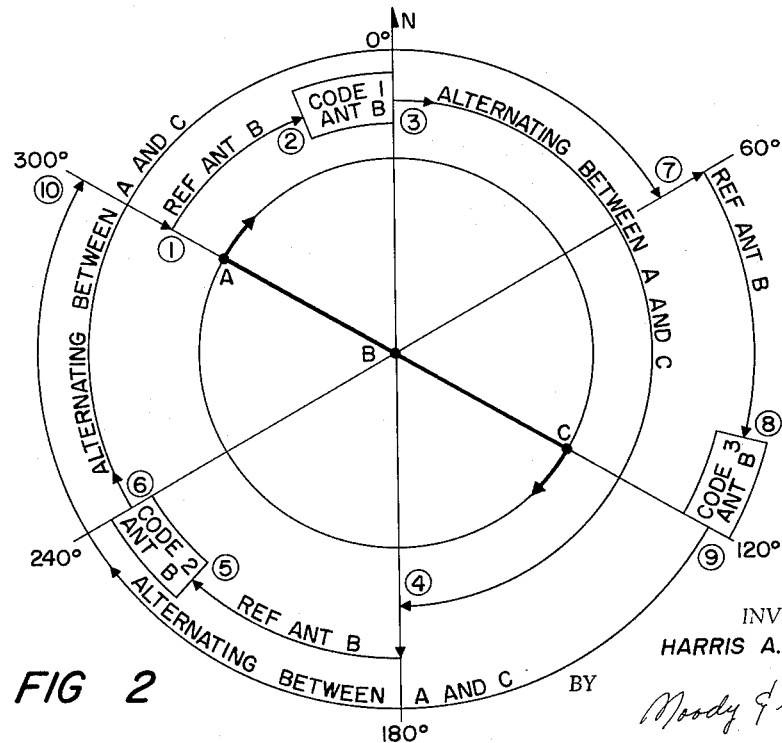

FIGURE 2 represents a transmitter sequence diagram in accordance with the present invention wherein a better utilization of measurement time is realized. The diagram of FIGURE 2 represents a sequence of transmissions from the antenna site which extends over two complete revolutions of the antennas A and C about the fixed antenna B. The transmitting sequence of this embodiment permits three measuring intervals each with a particular azimuth reference during two successive revolutions of the antenna system. Thus, assuming at the initiation of the sequence, that the antennas A and C are aligned as in FIGURE 2, a 720° sequence may be considered to be initiated at point 1 with the application of phase reference transmission from antenna B until the antennas rotate to sequence position 2 at which time a first phase code is transmitted from antenna B. At point 3 phase code 1 from antenna B is interrupted and the transmitter is switched alternately between antennas A and C for 180° of revolution to point 4 on the sequence diagram. At point 4, the alternation between antennas A and C is terminated and a phase reference transmission from antenna B is affected until point 5 on the sequence diagram at which time a second phase code, code 2, is transmitted from antenna B. At point 6 on the sequence diagram an alternating transmission is affected between antennas A and C for 180° of antenna revolution to point 7 on the sequence diagram. At point 7, a phase reference transmission is again affected from antenna B until at point 8 a third phase code, code 3 is transmitted from antenna B. At point 9 on the sequence diagram, an alternating transmission from antennas A and C is again affected for the remaining 180° of the two revolution sequence such that at point 10 in the sequence diagram the transmitter sequence begins over at point 1.

The embodiment defined by the transmission sequence of FIGURE 2 establishes three reference azimuths from which counter start logic may be effected similar to that previously described. Thus, a first reference would be 0° at point 3 in the transmission sequence; a second reference would be 240° at point 6 in the transmission sequence; and a third reference would be at point 120° at point 9 in the transmission sequence. It is to be noted that each of the references is established as being the azimuth of the rotating antenna system at the completion of the transmission of a phase code interval from antenna B and at the time transmission is switched from B to A. The logic employed is similar to that previously described with respect to that of the single phase code embodiment of FIGURE 1. If one assumes, as in the previous embodiment, that the antennas A and C rotate about antenna B at a rate of one revolution per second, and that the transmitter is switched alternately between antennas A and C at a rate of 3600 alternations per second, it may be noted that an embodiment employing the transmission sequence of FIGURE 2 makes three azimuth measurements for each two revolutions of the antenna system, and the azimuth may then be read out to the indicator every two-thirds second rather than every second as in the previous embodiment.

Figure 3A:
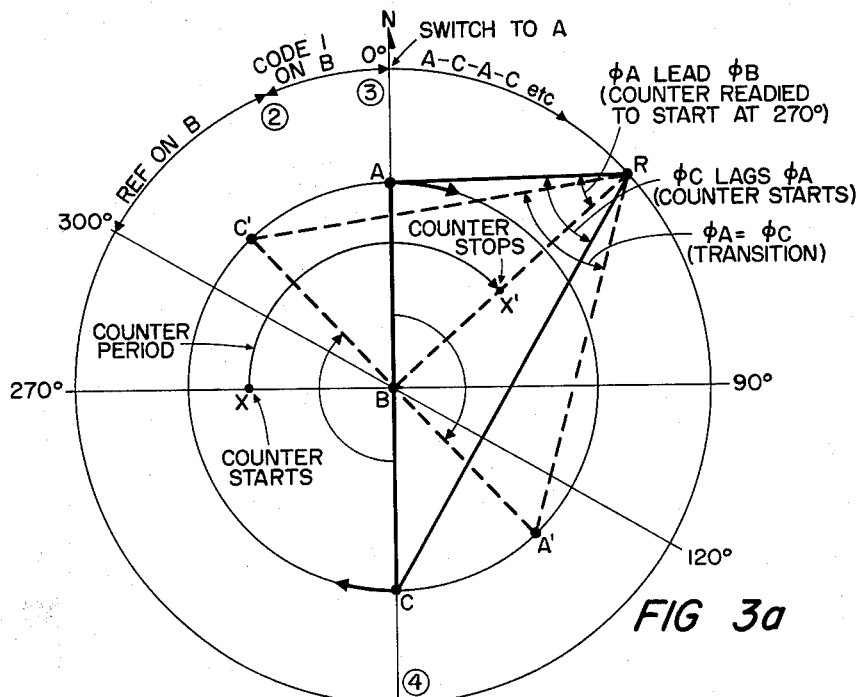
Figure 3B:
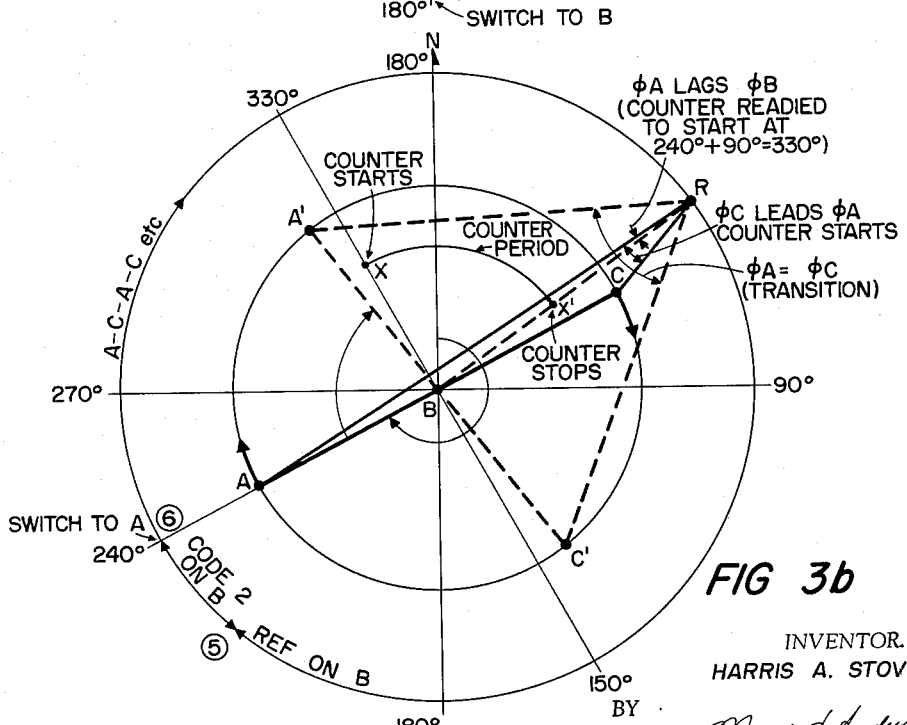
Figure 3C:
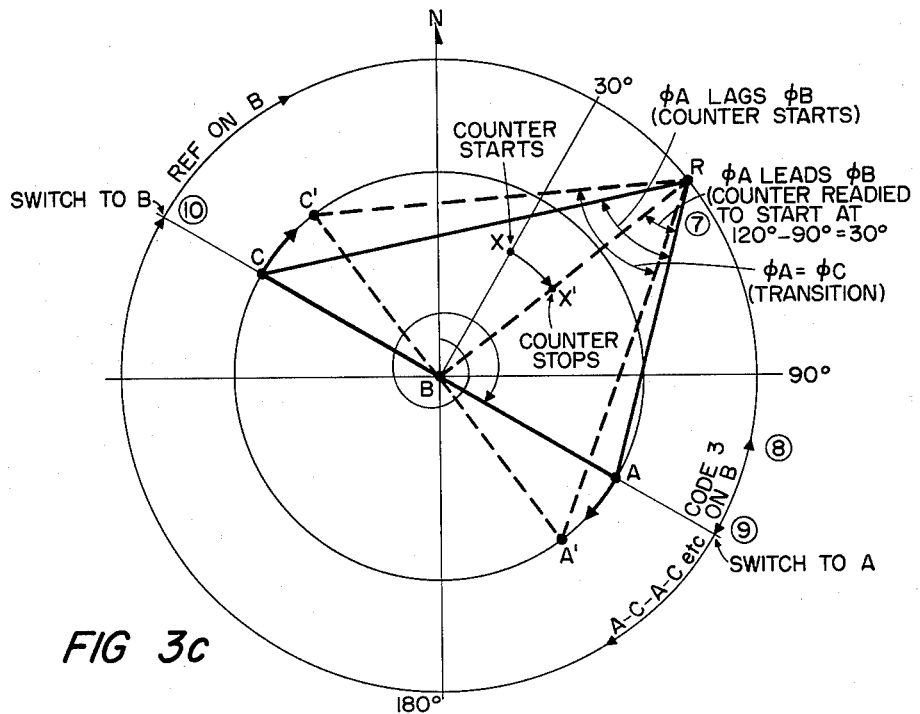

The operating principle of a system employing the transmission sequence of FIGURE 2 may best be illustrated and comprehended with reference to FIGURES 3A, 3B and 3C. FIGURES 3A, 3B and 3C collectively represent the counting principle for one complete transmission sequence; that is, for two complete revolutions of antennas A and C about antenna B during which time three reference azimuths are established and three azimuth measurements made with respect thereto.

FIGURE 3A represents the initiation of transmitter sequence at the time that antenna A is aligned beneath the first reference azimuth of 0°. As previously described this reference occurs at the completion of the transmission of code 1 from antenna B at point 3 in the transmission sequence. The system principle for this sequence is similar to that described with respect to the previous embodiment illustrated in FIGURE 1A. Since the receiver lies above the perpendicular bisector of the line between antennas A and B, $\phi_a$ leads $\phi_b$ as the transmitter is switched to antenna A at point 3 in the transmitter sequence. In accordance with previously described counter start logic this condition readies the counter to start at 270° as indicated by point X on the diagram. When the transmitter is switched to antenna C, $\phi_c$ lags $\phi_a$ and the counter starts. When antennas A and C rotate to A′ and C′, respectively, the perpendicular bisector of the line between antennas A and C passes through the receiver site at R, $\phi_a$ equals $\phi_c$ and the phase transition is encountered to stop the counter at point X′ in the diagram. The counter indicates the azimuth of the receiver location R with respect to the antenna system.

Referring now to FIGURE 3B, antennas A and C have been advanced in rotation such that antenna A is aligned adjacent the second azimuth reference of 240°. The 240° azimuth reference is established by the conclusion of transmission of the second phase code, code 2, from antenna B. At this point in the sequence the receiver logic circuitry readies the counter to start at either 240°+90° or 240°−90°, depending upon the relative phase between transmissions from antennas A and B at point 6 in the transmitter sequence. For the receiver location indicated in FIGURE 3B, $\phi_a$ lags $\phi_b$ at point 6 in the sequence and the counter is ready to start at 240°+90° or 330° as indicated by point X in the diagram. (Note that the counter start logic is consistent with the previously described embodiment as concerns the relative phases between transmissions from A and B). As the transmitter is switched to antenna A at point 6 in the sequence, the counter is ready to start at 330° and, as the antenna is switched to C during the ensuing alternating sequence, $\phi_c$ leads $\phi_a$, and the counter starts. If the antennas A and C then continue rotation to point A′ and C′, respectively, the perpendicular bisector of the line between antennas A and C again passes through the receiver site at R where $\phi_a$ equals $\phi_c$ and the phase transition is again encountered to stop the counter at point X′ of the diagram. The counter again indicates the azimuth of the receiver.

FIGURE 3C illustrates the third and final measurement of the two revolution sequence illustrated in FIGURE 2. Antennas A and C are shown to have been further rotated to the indicated positions with antenna A aligned with the third azimuth reference of 120° which is defined by point 9 in the transmission sequence at the conclusion of the transmission of code 3 from antenna B. As the transmitter is switched to antenna A at point 9 in the sequence, $\phi_a$ leads $\phi_b$ and the counter is readied to start at the new azimuth of 120°−90°, or 30°. As the transmission is switched to antenna C, $\phi_c$ lags $\phi_a$ and the counter starts at point X on the diagram. As the antennas A and C continue rotation to points A′ and C′ the perpendicular bisector of the line between antennas A and C again passes through the receiver site at R where $\phi_a$ equals $\phi_c$ and the resulting phase transition causes the counter to stop at point X′ on the diagram, at which time it will again have counted to the azimuth of the receiver at point R.

The sequence diagrams of FIGURES 3A, 3B and 3C thus illustrate the counter start and stop logic employed when the receiver R is located above the perpendicular bisector of the line between antennas A and B at the start of the transmission sequence (point 3). It is seen that in two revolutions of the antenna system the azimuth of the receiver R is counted three times with each count being made from a counter start point defined by one of three reference azimuths.

Figure 4A:
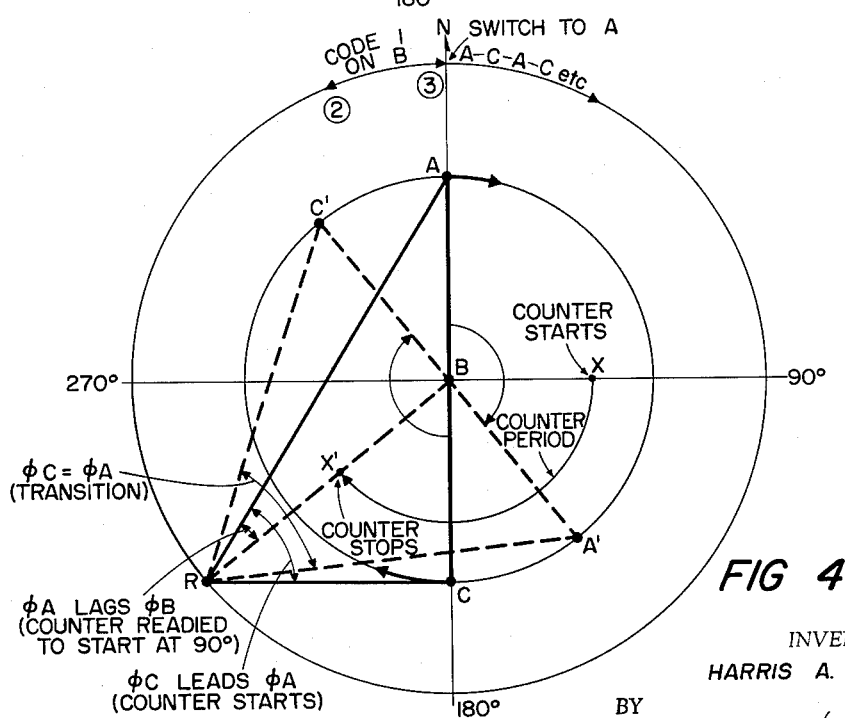
Figure 4B:
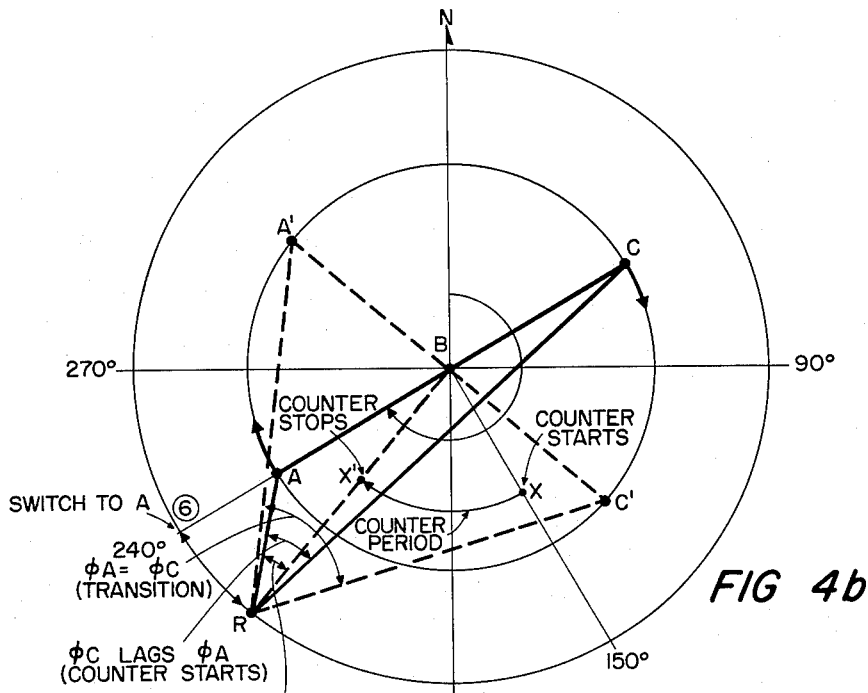
Figure 4C:
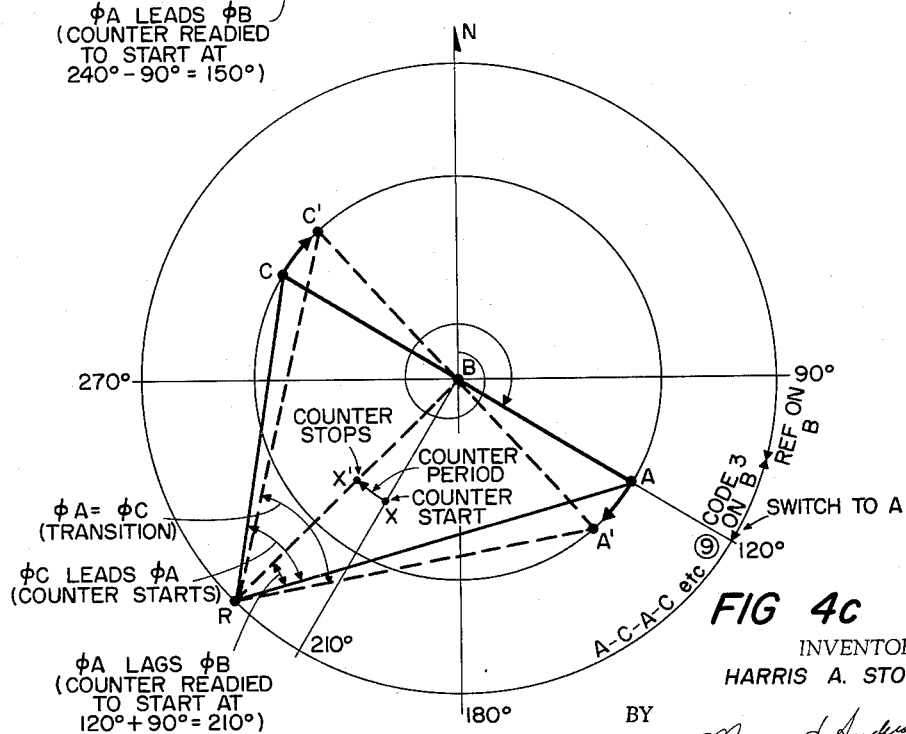

FIGURES 4A, 4B, and 4C further illustrate the principles of a system in accordance with a transmission sequence of FIGURE 2 where the receiver site R may be located beneath the perpendicular bisector of the line between antennas A and B at point 3 in the transmission sequence. FIGURE 4A illustrates the measurement made with respect to the first azimuth reference of 0° wherein $\phi_a$ lags $\phi_b$ at the time the transmitter is switched to A at point 3 in the sequence such that the counter is ready to start at the reference azimuth +90°. This sequence is like that described with respect to FIGURE 1B as concerns the single phase code embodiment.

FIGURE 4B illustrates the second count in the sequence utilizing 240° as the reference azimuth wherein $\phi_a$ leads $\phi_b$ when the transmitter is switched to A at point 6 in the transmission sequence such that the counter is ready to start at 240°−90° or 150°.

FIGURE 4C illustrates the third and final portion of the transmission sequence which utilizes 120° as the reference azimuth. As the transmitter is switched to A at point 9 in the sequence, $\phi_a$ lags $\phi_b$, and the counter is read to start at 120°+90° or 210°.

The diagrams of FIGURES 3 and 4 illustrate the consistency of the counter start and stop logic of the system and the manner in which three successive azimuth counts are effected for each two revolutions of the antenna system, each count being initiated from one of six counter start azimuths as defined by the reference azimuth being utilized and the relative phase between transmissions from antennas A and B at the time transmission is switched to A at the conclusion of the reference defining code transmissions from antenna B. The counter starts at the reference azimuth ±90° depending upon whether $\phi_a$ leads or lags $\phi_b$ at the conclusion of the reference code transmissions from antenna B.

Bearing in mind the previously described ambiguity possibilities of the single code of revolution embodiment of FIGURE 1, it is noted that the preferred embodiment in accordance with the transmission sequence of FIGURE 2 provides a system which may readily obviate these ambiguities. Regardless of the location of the receiver with respect to the transmitter site, such ambiguities will be encountered for but one of the three sequential measurements made in the two revolution transmission sequences. Thus, although one measurement may be ambiguous, two out of three in a given sequence will be consistent. A simple logic switching system may then be employed by which an ambiguous one of three successive azimuth measurements may be rejected as far as readout to an indicator is concerned.

Thus far, the invention has been described in terms of a first embodiment utilizing three antennas and a single azimuth reference by which one azimuth measurement is read out to the counter during each revolution of the antenna system. A second and more sophisticated system has been described employing three antennas and three azimuth references such that three azimuth measurements are made each two revolutions of the antenna system.

Figure 5:
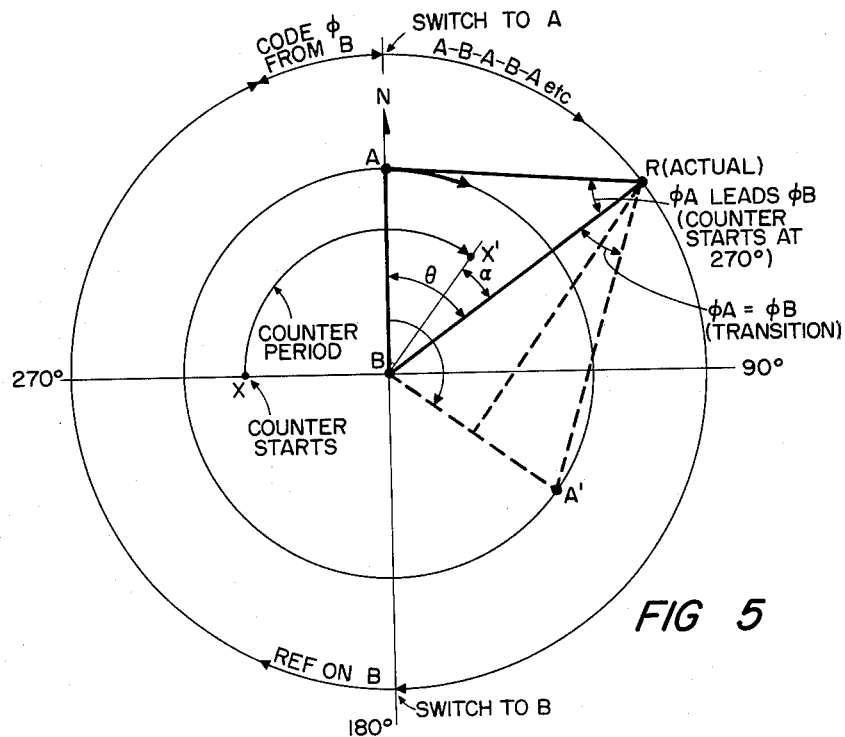
FIGURE 5 is a diagrammatic representation of the operating principles of a still further embodiment of the present invention.

Consideration may now be had of a modification of these embodiments in accordance with the present invention whereby only two antennas need be employed. Because of the relative geometry of the navigation problem defined by this invention, a workable system utilizing but a single rotating antenna in conjunction with the fixed antenna B may be embodied. Reference is made to FIGURE 5 wherein the antenna system is illustrated as being a fixed antenna B about which a single antenna A is rotated. In this embodiment the antennas would be spaced less than one-fourth wave length apart at the operating frequency. The operating principle of this two-antenna embodiment is completely harmonious with that defining the previously described three-antenna embodiments. The width of the previously defined ambiguity corridors would then be less than one-fourth wave length at the operating frequency. In the system of FIGURE 5, antenna A rotates about antenna B and the fundamental difference in the transmission sequence is that the sequences previously defined as an alternate transmission from antennas A and C now becomes an alternate transmission from antennas A and B. Thus, the transmission sequence is defined by a reference phase transmission from B prior to a short interval of code transmission from B for azimuth reference establishment and completed by a period of the alternate transmission from antennas A and B. As in the previous system, the line between antennas A and B is aligned with a 0° reference at the conclusion of the phase code transmission from antenna B. When the transmission is switched to A at the initiation of the alternate A–B transmission period, $\phi_a$ (for the receiver location illustrated) leads $\phi_b$ and readies the counter to start at 270° as indicated by point X on the diagram. Antenna A rotates about antenna B until a position A′ is reached such that the perpendicular bisector of the line between antennas A and B passes through the receiver location at R. At this point the phase transition is realized where $\phi_a$ equals $\phi_b$ and the counter is caused to stop at point X′ on the diagram. The embodiment utilizing but two antennas is therefore seen to provide a counter indication equal to an angle $(\theta - \alpha)$ where $\theta$ is the true azimuth and $\alpha$ is the discrepancy between $\theta$ and that indicated by the counter. It is noted that the two antenna embodiment introduces a discrepancy $\alpha$ in the azimuth measurement due to a lack of symmetry which is enjoyed by the previously described embodiment. This discrepancy, however, does not negate the system from an operational standpoint since in practice the distance between antenna B and the receiver site would be considerably greater than the distance between the antennas B and A, and the assumption that the $\theta - \alpha = \theta$ becomes valid. The two antenna embodiment diagram in FIGURE 5 employs the same counter start logic previously discussed and includes the same ambiguity corridor as do the other systems. The system is, however, operational. One antenna is eliminated at the expense of what might be an undesirable electrical unbalance. The received spectrum with the three antenna embodiment may be defined as a reference carrier center frequency about which are symmetrically spaced side bands defined by the phase shifted alternate transmissions from antennas A and C. In the two antenna embodiment of this invention, this symmetry is not enjoyed, and the position of the reference carrier would have a tendency to shift during the transmission sequence and perhaps introduce detection problems. The possibility of utilizing but two antennas is included herein to emphasize that the invention is not limited to a three antenna embodiment, though the latter is a preferred embodiment.

The invention has thus far been described in terms of operating principles by which the invention is defined. Consideration will now be made of means for implementing the aforedescribed principles into a system. It is to be emphasized that the following description is by no means a limitation as concerns the present invention since it is contemplated that present technology exists for a wide variety of circuitry to effect the aforedescribed principles.

Figure 6:
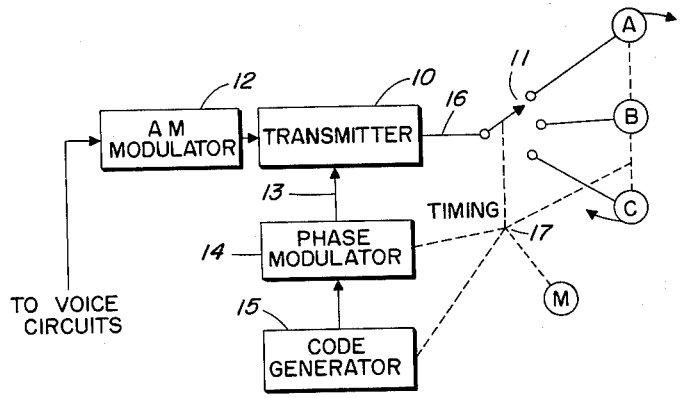
FIGURE 6 is a functional diagram of the transmitting arrangement of the present invention.

Consideration might first be made of the transmitter portion of the navigation system. FIGURE 6 represents a general functional diagram of the transmitter portion of the invention, wherein a transmitter 10 receives an input from an A.M. modulator 12 and a second input 13 from a phase modulator 14. Phase modulator 14 is controlled by a code generator 15. The output 16 from transmitter 10 is applicable through selected positions of a switching means 11 to one of the three antennas A, B, or C. A timing linkage 17 is functionally indicated as being tied to and controlling the functioning of code generator 15, and controlling the switching action of switch 11. The rotation of antennas A and C about antenna B is depicted by a motor drive means.

The transmission scheme depicted in FIGURE 6 is that of the system broken into its basic functional elements. The system will be further considered in the form of a more detailed embodiment by which the transmitting system performs the sequence of the preferred embodiment as illustrated in FIGURE 2. As previously described, the transmission sequence requires switching of transmitter 10 between the antennas at the proper time with regard to orientation of the rotating antennas A and C as well as affecting certain phase code transmissions from antenna B and the necessary alternate transmission from antennas A and C. In general the phase modulator under the control of the code generator must produce the desired reference phase and the phase sequences which define the various azimuth reference code transmission periods.

The receiving system of the present invention is depicted functionally in terms of its basic operational blocks in FIGURE 7. The receiver consists of the normal front end circuits 20 followed by a phase locked loop which performs both the coherent phase detection and the coherent amplitude detection and separates them by means of coherent phase detector 21 and coherent A.M. detector 22. The output of the A.M. detector 22 is the voice or other information which was applied at the transmitter. The output of the coherent phase detector 21 contains the azimuth information. It might again be emphasized that the azimuth information in accordance with this invention is in the form of a digital data stream at a bit rate (for the value assumed in the previous description) of 3600 bits per second. The data stream from phase detector 21 is applied to a bit detector 23 which performs the function of converting the data stream into mark and space decisions. This detection might be accomplished by known effective methods generally defined as kinematic detection and employ integration of a bit period and making the decision between mark and space at the end of the integration time followed by a dumping of the integrator and a repeat operation for each bit period. The output from the bit detector 23 is thus digital in nature and circuitry following the output from bit detector 23 is digital in nature. The output from detector 23 is applied to data processing circuits 24 and the counter 25. The data processing circuits 24 recognize the reference codes as they come along in the transmission sequence and additionally employ the counter start logic as defined by the relative phase between the transmission from antennas A and B at the conclusion of the code transmission sequences. Thus, output 26 from data processing circuits 24 affects a proper counting starting point for counter 25. Circuits 24 additionally recognize the two successive like bits which define the phase transition which is utilized to stop the counter and provide the timing for the transfer of the azimuth information to the azimuth display 27.

An implementation of general transmission system depicted in FIGURE 6 is illustrated in FIGURES 8, 9, and 10. Reference is first made to the transmission sequence as illustrated diagrammatically in FIGURE 2. The following discussion will pertain to the embodiment portrayed in FIGURE 2 wherein three code reference transmissions are utilized for each two revolutions of the antenna system. The complete transmission sequence is seen to break down into three basic subsequences, each defined by a period of reference phase transmission from antenna B followed by the transmission of a reference azimuth phase code transmission from antenna B, and finally a 180° period of alternate transmission of the reference phase from antennas A and C. A method of implementing the transmission sequence is shown functionally in FIGURE 8.

The transmitter may include an oscillator 30 for generation of the carrier frequency. The output from the oscillator 30 is carried through three gates 31, 32, and 33 to delay lines 34, 35, and 36 respectively. Delay line 35 is termed a nominal delay line defining the reference phase of the transmission. Delay lines 34 and 36 are of respectively shorter and longer durations than that of the reference delay line 35 such that the outputs therefrom respectively lead and lag the output of reference delay line 35. The outputs from delay lines 34, 35, and 36 are carried through gates 37, 38 and 39 respectively to an amplifier 40 and the output from amplifier 40 is connected through gates 41, 42 and 43 to antennas A, B, and C, respectively. Amplitude modulation is introduced into the system by applying the output of an amplitude modulator 44 to the amplifier 40 prior to application to the antennas.

The circuitry depicted in FIGURE 8, under the control of gating input voltages 103 through 108, is effective in establishing the transmitting sequences and the desired phase code modulations when utilided in conjunction with a timing commutator such as depicted in FIGURE 9.

Reference is first made to the sequence chart of FIGURE 10 which illustrates functionally those of gate voltages 103 through 108 ($P_1$ through $P_6$) which must be present and the manner in which they must be applied to affect the different transmission requirements called for by the aforedescribed transmission sequence.

During those periods of the transmission sequence when the transmission of reference phase is to be made alternately from antennas A and C, gate voltage $P_2$ is generated to apply the output from oscillator 30 to amplifier 40 through the nominal (reference) delay line 35 by closing gates 32 and 38 of FIGURE 8. This fulfills the requirement that the reference phase be transmitted during this interval. During this transmission interval, gate voltages $P_4$ and $P_6$ must be alternately generated so as to respectively close gates 41 and 43 and thus apply the output from amplifier 40 alternately to antennas A and C.

During the transmission interval when a reference phase transmission from antenna B is to be effected, the reference phase is established by alternate generations of the gate voltages $P_1$ and $P_2$ alternate to insert the long and short delay lines 36 and 34 between oscillator 30 and amplifier 40; and, in addition, gate voltage $P_5$ is generated to connect the output from amplifier 40 through gate 42 to antenna B.

The phase code sequences to be transmitted from antenna B for the establishment of azimuth reference in the system, may be effected by generating appropriate voltages $P_1$ and $P_3$ in particular preselected permutations or sequences so as to apply the output from oscillator 30 through the long delay line 36 and the short delay line 34. Continuous generation of gating voltage $P_5$ is employed during code transmission to apply the output from amplifier 40 through gate 42 for transmission from antenna B.

The manner in which the gating voltages $P_1$ through $P_6$ may be generated is illustrated in FIGURE 9 which embodies a perforated disc commutator arrangement in conjunction with light sensitive devices as a means for providing the required timing and the code generation. The commutation arrangement of FIGURE 9 might be one used to implement the transmission sequence of FIGURE 2 wherein three azimuth measurements are made during every two revolutions of the antenna system. With reference to FIGURE 9, three discs 51, 52, and 53 are utilized in conjunction with a fourth time-sharing disc 55 to provide the three successive sub-sequences of the complete transmission sequence during two-revolution periods of the disc with the establishment of three discretely different phase code transmissions during the two-revolution sequence.

The generation of the gating voltages $P_1$ through $P_6$ is illustrated functionally in FIGURE 9 as employing, with regard to a first disc 51, six light sensitive pick-up devices 75–80 in conjunction with six slot configurations 57–62 which are caused to rotate past the pick-up devices. Each slot configuration has a different radial displacement on the disc 51. A light source or sources (not illustrated) would be utilized in conjunction with each of the sensing devices 75–80 and the plane of the disc caused to pass between the light source and the sensing devices to develop a voltage by the sensing devices whenever a slot configuration lies between the sensing device and the light source. By this means, sensing devices 75 and 76 would alternately develop gating voltages $P_1$ and $P_3$ during the transmission interval between points 1 and 2 wherein a reference phase transmission is to be effected from antenna B. During this interval a sensing device 77 would develop a gating voltage $P_5$ to effect selection of antenna B. As the disc continues to rotate clockwise, the next sequence, that of a transmission of phase code 1 from antenna B would be affected by the development of a particular permutation of voltages on sensing devices 75 and 76 due to slot configuration 57 and 58 passing between the light source and these devices to develop gating voltages $P_1$ and $P_3$. During this phase code interval, sensing device 77 continues, due to slot 59, to develop a gating voltage $P_5$ for selection of antenna B.

During the period of alternate transmission between antennas A and C between points 3 and 4 on disc 51, voltages are alternately generated by sensing devices 78 and 79 in response to alternate circumferential displacements of slot configurations 60 and 61 passing over the sensing devices 78 and 79. The nominal phase is effected by slot 62 generating gate voltage $P_2$ on sensing device 80.

The second portion of the transmission sequence defined by reference phase transmission from B followed by a code 2 transmission from B and the ensuing alternate transmission period from antenna A and C is affected in like manner from a second commutator disc 52. Disc 52 is provided with slot configurations 63–68 and associated sensing devices 81–86 to develop a second permutation of gating voltages $P_1$ through $P_6$ during the second 240° rotation in the complete transmission sequence. Relative timing to effect the sequence is realized by a 240° clockwise displacement of sensing device 81–86 from those associated with the first disc 51.

A third disc 53 employs slot configurations 69–74 in conjunction with sensing devices 87–92 to develop a third generation of gating voltages $P_1$–$P_6$ during the final 240° of the complete transmission sequence. To effect the proper timing sequence, sensing devices 87–92 are displaced clockwise 240° from those associated with the second disc 52.

In order that the gating voltages $P_1$–$P_6$ may be applied in proper sequence to the gates of FIGURE 10, a timing disc 55 might be employed having a single slot 96 and three sensing devices 97, 98 and 99 displaced at 120° intervals. With this arrangement, since the complete transmission sequence takes two revolutions of the antenna and thus of the commutating discs 51, 52 and 53, a two-to-one (2:1) gear ratio 56 may be inserted in the drive so that timing disc 55 completes one revolution during the time that the discs 51, 52 and 53 complete two revolutions. Now the development of a voltage on sensing device 97, due to its alignment with slot 96 on disc 55, may be used as a coincidence gate voltage to apply the outputs from sensing devices 75–80 through gates 93a–93f to output lines 103–108 during the first 240° of transmission sequence. Upon completion of this sequence, point 4 of disc 52 will have advanced by 240° to be in line with sensing devices 81–86 and slot 96 on timing disc 55 will have advanced to sensing device 98 such that a gating volatge is now applied to "and" gates 94a–94f to connect the voltage from the sensing devices 81–86 to the output lines 103–108. At the conclusion of this sequence the third commutator disc 53 will have rotated 480° with point 7 aligned with sensing devices 87–92, and slot 96 on timing disc 55 will have advanced an additional 120° to develop a gating voltage on sensing device 99 and allow the sequence of voltage to be passed through gates 95a–95f to the output lines 103–108. In this manner it is seen that permutation gating voltages $P_1$–$P_6$ may be developed in the proper repetitive sequence to operate the gates within FIGURE 8 to effect the transmission sequence.

The commutator arrangement of FIGURE 9 may take a variety of alternate forms from that depicted. For example, the timing gate pulses from disc 55 might be employed to control the energization of the illuminating lamp sources (not illustrated) which would be used in conjunction with each of the groups of sensing devices. This arrangement would permit the elimination of the "and" gates 93, 94 and 95. Further modification might employ the use of wiper elements and conducting strips on nonconducting discs rather than the light sensitive pick-up devices illustrated. A still further arrangement might employ magnetic tape strips on the disc in conjunction with tape pick-up heads in place of the light sensitive devices.

A more detailed implementation of the receiver embodiment depicted generally in FIGURE 7 is illustrated in FIGURES 11, 12, 13 and 14.

With reference to FIGURE 11, the receiver R.F. and I.F. circuitry 20 is illustrated conventionally as an R.F. amplifier 110 receiving the transmitted signal, a mixer 111 receiving the output from amplifier 110 and that of a local oscillator 112 to produce an intermediate frequency for application to amplifier 113. The output 28 of I.F. amplifier 113 is applied to a first phase detector 21, the output 21a of which is fed back through a filter 116 to control the frequency of a voltage controlled oscillator 114. The output of oscillator 114 is applied as a second input to phase detector 21 in the form of a signal having a frequency corresponding to the carrier frequency and a phase shifted 90° with respect to the carrier. The output 21a of phase detector 21 contains the phase modulation information to be used in azimuth detection.

The output from voltage controlled oscillator 114 is additionally applied through a 90° phase shifter 115 as a first input to a second phase detector 22 which also receives the intermediate frequency signal from amplifier 113. In this manner, phase detector 22 acts as a coherent mixer and produces an output which contains the amplitude modulation information, for example, the voice signal, if the channel is so utilized.

The output 21a from phase detector 21 contains the azimuth information and it is this output to which digital processing is applied to ultimately arrive at the desired azimuth determination.

The first step in the digital processing of the detected phase modulation output 21a is to perform bit detection of this output. For this purpose, FIGURE 12 illustrates a means by which bit detection of the phase modulation input 21a may be effected. A keyed integrator in conjunction with bit timing accomplishes this function. A method of obtaining the bit timing as illustrated in FIGURE 12 is that of applying the signal 21a through a low-pass filter 120 to a full wave rectifier 121. The output 122 of rectifier 121 is applied as an input to a phase detector 123. The output from phase detector 123 is passed through a filter 124 to control the frequency of a voltage controlled oscillator 125. The output 126 of oscillator 125 is applied as a second input to phase detector 123. In this manner the voltage controlled oscillator 125 is phase locked to the output from rectifier 121 and the necessary bit timing is thus derived from the oscillator 125.

The detected phase modulation input 21a consists of a rectangular wave perturbed by noise except for those brief periods when an unmodulated signal is being transmitted or the code signals are being transmitted. The phase of this rectangular wave, however, reverses with time and is dependent upon the position of the receiver with respect to the transmitter site. Passing this rectangular wave through low pass filter 120 converts the wave into a sine wave and the full wave rectification by rectifier 121 removes the effects of phase reversals of the square wave. The full wave rectified sine wave 122 as applied to phase detector 123 possesses a large frequency component at a frequency which is equal to the bit rate. Voltage controlled oscillator 125 is phase locked to this bit rate frequency component and thus serves to provide the bit timing for the receiver system.

The detected phase modulation signal 21a is applied to a gated integrator 127 under the control of the bit timing wave 126 developed in the oscillator 125. The bit timing signal 126 may be utilized to provide a reset pulse to reset integrator 127 to zero at the beginning of each bit period and to provide a sampling pulse to sample the output of the integrator 127 at the end of each bit period. For this purpose the output of integrator 127 is applied to a sampler 128 under the control of the timing signal 126 and the output 29 from sampler 128 consists of the integral of the phase modulation signal 21a over the bit period and functions as a maximum likelihood estimator of whether the signal is a mark or a space during the bit period. Output 29 of FIGURE 12 is thus a bit stream comprised of mark and space intervals occurring alternately during certain periods of transmission sequence, in predetermined permutations of mark and space intervals during the reference phase and code transmission sequences, and includes like successive intervals of mark or space bits during the phase transition periods defined by the transmission sequence and receiver location.

The bit detection method depicted in FIGURE 12 is of a synchronous type and thus develops a mark or space decision for each bit interval. As such, the aforedescribed means for transmitting a reference phase by alternate transmission of advanced and retarded phase signal from antenna B is considered to be a preferred method of transmitting the reference phase. With this arrangement, the average of the advanced and retarded phase intervals becomes the reference and the bit stream 29 would be comprised of definite alternate mark and space decisions during the phase reference transmission interval. Alternate methods of transmitting the reference phase might be employed. A carrier wave nominal phase transmission might be effected during this interval. Using this latter arrangement, however, would result in a random pattern of mark and space decision occurring in the bit stream 29 due to noise and inherent unbalance in the bit detector. Should this latter expedient be employed to develop the reference phase, the bit detector might be biased so as to generate a continuous sequence of either mark or space decisions during the reference phase transmission interval for the purpose of eliminating a random mark-space decision sequence which conceivably might include in its random distribution, one of the phase code words. It is considered a preferred embodiment, therefore, to establish the reference phase by the transmission of a set pattern of advanced and retarded phase intervals during this portion of the transmission sequence, it being necessary, of course, that the pattern be such that the average phase thereof corresponds to the nominal phase.

The remaining portion of the receiver circuitry, depicted in FIGURES 13 and 14, acts as a data processor acting on the detected bit stream developed in FIGURE 12. The bit stream 29 is processed to develop control voltages to effect proper counter start-stop operation in accordance with the detected phase code words, the 180° ambiguity decisions, and the phase transition occurrences, all of which is contained as digital information in the detected bit stream.

The phase code transmission periods emanating from the fixed antenna B may be any of many possible codes and will be termed code words. For purpose of this discussion let it be assumed that each of these phase codes or code words is in the form of a predetermined 7-bit sequence of mark and space intervals. As previously discussed, these bit intervals are developed at the transmitter as retarded and advanced phase intervals. Since a balance would be desirable between the retarded and advanced phase transmission periods for each code word, the following code words might be utilized:

Code 1—0101110
Code 2—1011100
Code 3—0111001

With the above codes defined, it follows that those periods of the transmission sequence during which the counter is to be operated are characterized by a stream of alternate mark and space bits, that is, "0" and "1" bits, following each code transmission interval. The phase transition defining the time at which the counter is to be stopped will accordingly be characterized by two successive "0" bits or two successive "1" bits occurring during this interval.

FIGURE 13 illustrates the detected bit stream 29 as being applied to a shift register 132 containing eight stages. The last seven stages of the register are utilized to recognize the reception of one of three code words and the first stage is utilized in making the 180° decision which must be effected as concerns the point at which the counter starts. The shift register will not be described in detail here as such devices are known in the art.

The conductive state of each shift register stage 1–8 is recognized by a logic configuration comprised of "and" gates and by this means the presence of each of six code words in the shift register provides output pulses to be used to affect associated counter start operations. Six code words are referred to rather than three, since the first bit following a transmitted code word is used to make a 180° decision regarding the starting point of the counter. Thus, there are actually six starting points for the counter as has been previously borne out in the discussions and diagrams relating to the operating principles of this invention. These six code words are comprised of three code words as transmitted which become, in effect, six code words each one bit longer than a transmitted code word. The phase transition to stop the counter is recognized by comparing the outputs from the first two shift register stages 1 and 2 by means of a logic gate arrangement to determine if they are like bits. The logic of FIGURE 13 will provide a counter stop pulse if the outputs from the first two shift register stages are alike and none of the six code words is present in the shift register.

In operation, the presence of code 1 in the shift register is recognized by applying the register outputs 133 through 139 as inputs to a code 1 "and" gate 144. Inverters 141, 142 and 143 are inserted in the output lines 133, 135 and 139 respectively, such that all inputs to the code 1 "and" gate 144 are "1" bits when code 1 is in stages 2–8 of the shift register. With code 1 in the shift register, gate 144 produces a "1" output 153 which is applied as first inputs to each of two further "and" gates 155 and 157. The output from the first stage of the shift register 132, which is the 180° decision bit, is applied directly as a second input to "and" gate 157 and, through an inverter 154, as a second input to "and" gate 155. With this arrangement, should the transmitted bit following the seventh and last digit in code 1 be a "0," gate 155 develops an output 156 which may be utilized to start the counter at 90°. Should the first bit following the seventh and final bit of code 1 be a "1," an output 158 is developed by "and" gate 157 for use in starting the counter at 270°. An assumption is made here that a "0" bit corresponds to the phase of the first interval transmitted from antenna A following the transmission of code 1 from antenna B lagging the reference phase of the system. Correspondingly, a "1" bit is defined by the phase of the bit leading the reference phase.

By similar means, output pulses are developed to provide counter start pulses in response to reception of codes 2 and 3 with 180° decisions being effected in accordance with the conductive state of the first stage of the shift register 130 when a code word is contained in the remaining stages. For this purpose, the outputs of the last seven stages of the shift register are additionally applied to code 2 and code 3 "and" gates 148 and 152, respectively, with inverters placed in those lines connected to shift register stages in which a "0" is contained. The output 159 from code 2 "and" gate 148 is applied as first input to "and" gates 161 and 163. The second inputs to gates 161 and 163 are the outputs 140 from the first shift register stage and its inverted form, respectively. If the first bit following code 2 is a "0," an output pulse 162 is developed through "and" gate 161 for use in starting the counter at 330°. If the first bit following code 2 is a "1," an output 164 is developed through "and" gate 163 for use in starting the counter at 150°.

Code 3 "and" gate 152 in conjunction with further "and" gates 167 and 169 is utilized in a similar manner to develop an output 168 for use in starting the counter at 210° when the first digit following code 3 is a "0"; and an output 170 for use in starting the counter at 30° should the first bit following code 3 be a "1."

The phase transition herein characterized as successive like bit intervals is recognized by comparing the output from the first two stages of shift register 132. If they are alike, and providing that no one of the phase codes is within the shift register, an output pulse is developed for use in stopping the counter. The comparison between the first two shift register stages is made by applying outputs 139 and 140 as inputs to an "and" gate 171 which will develop an output should these two stages each contain a "1" bit. The two outputs 139 and 140 are inverted through inverters 172 and 173 and applied to an "and" gate 174 to likewise provide an output should the two stages contain a "0" bit. The requirement that the counter stop pulse be generated if these two stages contain like bits in the absence of one of the code words being contained in the shift register, is fulfilled by means of an "and" gate 178 receiving inverted outputs from each of the code words "and" gates 144, 148, and 152 and developing an output only when no one of the three codes is within the shift register. The output from "and" gate 178 is applied as a third input to each of "and" gates 171 and 174. The outputs from "and" gates 171 and 174 are applied through an "or" gate 181 to provide a counter stop output 182 when a phase transition is experienced at the receiver site and one of the code words is not within shift register 130.

The data processing circuitry depicted in FIGURE 13 has thus far been described in terms of the development of six counter start pulses, and a counter stop pulse. The start pulses were seen to be developed by means of a shift register and logic gating circuitry which recognized the transmitted code intervals and made a 180° decision to provide a start pulse which could be utilized to place the proper initial count within the counter and to start the counter action. FIGURE 14 represents the remaining portion of the receiver circuitry and illustrates an embodiment by which the aforedescribed start pulses and stop pulse may be used to control the counter operation.

FIGURE 14 illustrates a conventional decade counter ring 25 comprised of four cascaded decade counters each of which might comprise a four stage binary counter with appropriate feedback to modify the normal count of 16 to a count of 10. Each of the stages in the counters would have first and second sections respectively identified as "Q" and "$\overline{Q}$." The tabulation of FIGURE 14 depicts each of the necessary azimuth counts from which the counter 25 must be caused to start in accordance with the established operating principles. Since each bit interval in the system is definitive of 0.1° of azimuth, the counter start points are indicated to the first decimal place.

The six start pulses 162, 158, 168, 164, 156, and 170 may be connected in matrix-like fashion to each of the counters in the chain 25 to insert the desired corresponding starting count. Thus, start pulse 170 may be interconnected to the binary stages within each of the counters to effect a starting count of 030.0. FIGURE 14 accordingly illustrates starting pulse 170 as being applied to each of the counters in the chain, it being realized that pulse 170 would be connected through appropriate isolating means to the proper permutation of the Q and $\overline{Q}$ stages of each of the counters to establish the desired output digit. Start pulse 170 would, therefore, be utilized to set counter 25a to 0, counter 25b to 0, counter 25c to 3, and counter 25d to 0. The remaining start pulses would likewise be appropriately connected in matrix-like fashion to the counters within the ring so as to effect their associated starting counts.

By the above means each of the azimuth start pulses 156, 158, 162, 164, 168, and 170 it utilized to establish an initial count within the counter. To start the count action, all of the logic start pulses are applied to an "or" gate 189 to develop a common line output 196 to be used in starting the counter operation. In the embodiment of FIGURE 14, the starting of counter operation is effected by opening a gate to allow the bit stream 29 to enter the counter. The counter stop pulse 182 likewise is used to interrupt the application of the bit stream 29 to the input of the counter. FIGURE 14 illustrates the logic circuitry to accomplish the desired start and stop action. The output from "or" gate 189 is applied to one section of a flip-flop circuit 188 with the counter stop pulse 182 being applied to the other section of the flip-flop. The output from the "start" section of flip-flop 188 is applied to an "and" gate 185 to which the bit stream 29 is applied as a second input. Since the system necessitates an advance of the counter 25 for each information bit, the bit stream 29 is applied through a differentiator 190 the output of which is carried through a diode 192 and inverter 193 as a first input to an "or" gate 194 and through a second oppositely polarized diode 191 as a second input to "or" gate 194. The output from "or" gate 194 is thus a series of pulses in the form of binary "1" corresponding to each bit of the incoming bit stream 29. The output from "or" gate 194 is applied as the second input to "and" gate 185.

In operation, the application of an azimuth start pulse on line 196 to flip-flop 188 develops a binary "1" input to "and" gate 185 which will be maintained until flip-flop 188 is caused to reverse its conductive state. During this period the bit stream in the form of binary "1's" is allowed to pass through the "and" gate 185 to the input counter 25a of counter ring 25. The ring 25 then proceeds to advance with each incoming bit until the incoming bit stream is interrupted. The interruption of the bit stream is effected at the time that the counter stop pulse 182 is applied to the first section of the flip-flop 188, so as to develop a binary "0" output from flip-flop 188 to "and" gate 185. With this condition being maintained, the bit stream cannot pass through "and" gate 185 to the counter.

The remaining circuitry of FIGURE 14 illustrates the output of counter ring 25 being applied through a readout gate 186 to a decade azimuth indicator 27. Readout action is accomplished by utilizing the counter stop pulse 182 to open the readout gate 186 to allow the count to be transferred to the azimuth indicator at the instant which corresponds to the conclusion of the counting interval.

The operating principle of the counting operation is illustrated in FIGURE 15 wherein the bit stream 29 is indicated to show the presence of code 1, the period of alternate transmission from antennas A and C, and including the phase transition of like bits which generate the counter stop pulse. With the illustrated condition, start pulse 158 is generated to start counter operation at 270° at the conclusion of the code 1 interval since the next successive bit following code 1 is binary "1" in nature. Stop pulse 182 is seen to occur at the phase transition point where two successive binary "1" bits are recognized during this transmission interval. The input 195 to the counter 25 is illustrated as a series of pulses corresponding to each bit of bit stream 29 during the time interval between start pulse 158 and stop pulse 182.

Although the present invention has been described with respect to a particular embodiment thereof, it is not to be so limited as changes might be made therein which fall within the scope of the invention as defined by the appended claims.

I claim:

1. A digital omnirange navigation system comprising a transmitter site and a receiving station; said transmitter site comprising a fixed antenna means, further antenna means displaced from said fixed antenna means, means for rotating said further antenna means about said fixed antenna means at a predetermined rate, a transmitter, switching means connected between the output from said transmitter and said fixed and rotating antenna means, said switching means being adapted to affect selective connection between said transmitter and said fixed and rotating antenna means, phase code modulation means and timing means whereby during a predetermined rotational sequence of said rotating antenna means about said fixed antenna means a predetermined transmission sequence is effected; said transmission sequence comprising a first interval of phase reference defining transmission from said fixed antenna means, a second interval comprised of successive transmissions from said fixed antenna means of a predetermined permutation of signals having retarded and advanced phase with respect to said phase reference, and a third interval comprised of alternate transmissions from a predetermined pair of those antennas of which said fixed and rotating antenna means are comprised of a signal having said reference phase; said second transmission interval being terminated upon the line between said predetermined pair of antennas being in correspondence with a reference azimuth; said receiving station comprising phase detection means, bit detection means responsive to the output from said phase detection means to develop therefrom a binary stream of information bits corresponding to the relative phase of the received signal as compared to said reference phase, a digital counter, logic means effecting an advance of said counter in response to each successive information bit occurring during said third transmission interval from a starting count defined by said second transmission interval, and means responsive to two successive like formation bits occurring during said third transmission interval to stop said counter, said counter thereby displaying the azimuth of said receiving station from the transmitter site.

2. A navigation system as defined in claim 1 wherein said transmitter timing means comprises means whereby said successive transmissions occurring during said second transmission interval are comprised of successive subintervals of like time durations corresponding to a system bit rate as defined by the rate of switching between said antenna means during said third transmission interval.

3. A navigation system as defined in claim 1 wherein said rotating antenna means comprises a signal antenna displaced less than one-half wave length at the operating frequency from said fixed antenna means and wherein said third transmission interval is comprised of alternate transmissions from each of said fixed and rotating antennas.

4. A navigation system as defined in claim 3 wherein said transmission sequence is effected during one complete revolution of said rotating antenna about said fixed antenna means and wherein said third transmission interval is effected during one-half of said complete revolution.

5. A navigation system as defined in claim 4 wherein said receiver logic means includes means responsive to the relative phase of the first information bit interval subsequent to the second transmission interval with respect to said reference phase to effect a count sequence from one of two initial counts defined by the reference azimuth ±90°, respectively.

6. A navigation system as defined in claim 1 wherein said rotating antenna means comprises a pair of antennas oppositely disposed from said fixed antenna at equal radii of less than one-quarter wave length at the operating frequency, and wherein said third transmission interval is comprised of alternate transmissions from each of said pair of rotating antennas.

7. A navigation system as defined in claim 6 wherein said transmission sequence is effected during one complete revolution of said pair of rotating antenna means about said fixed antenna means and wherein said third transmission interval is effected for one-half of said complete revolution.

8. A navigation system as defined in claim 7 wherein said receiver logic means includes means responsive to the relative phase of the first information bit interval subsequent to the second transmission interval with respect to said reference phase to affect a count sequence from one of two initial counts defined by the reference azimuth ±90°, respectively.

9. A navigation system as defined in claim 1 wherein a transmission sequence is effected three times during two revolutions of said rotating antenna means about said fixed antenna means and each of the second transmission intervals of successive ones of said transmission sequences is defined as a discretely different permutation of advanced and retarded phase signal transmissions, each said successive second transmission interval being completed at a predetermined rotational position of said rotating antenna means with respect to said fixed antenna means so as to define a reference azimuth, said receiver logic means including means to start said counter at one of six counts corresponding to those azimuths leading and lagging each of said three reference azimuths by 90°, whereby said counter is adapted to count to the azimuth of said receiving station from said transmitter site three times during each two revolutions of said rotating antenna means with each of said three counts starting from one of said six counts as aforedescribed.

10. A navigation system as defined in claim 9 wherein said rotating antenna means comprises a single antenna displaced less than one-half wave length at the operating frequency from said fixed antenna means and wherein said third transmission interval is comprised of alternate transmissions from each of said fixed and said rotating antennas.

11. A navigation system as defined in claim 9 wherein said rotating antenna means comprises a pair of antennas oppositely disposed from said fixed antennas at equal radii of less than one-quarter wave length at the operating frequency, and wherein said third transmission interval is comprised of alternate transmissions from each of said pair of rotating antennas.

12. A navigation system as defined in claim 1 wherein said transmitter comprises a source of continuous wave signal, a reference delay means, advanced and retarded delay means respectively effecting a lesser and a greater delay than said reference delay means, said timing means comprising pulse generator means time synchronized with the rotation of said rotatable antenna means about said fixed antenna means, gating means responsive to said pulse generating means to affect connection of the output from said source of continuous wave signal through predetermined ones of said delay means to predetermined ones of said antenna means in response to predetermined orientations of said rotating antenna means with respect to said fixed antenna means.

13. A navigation system as defined in claim 1 wherein said transmitter comprises a source of oscillation, reference delay means, advanced and retarded delay means respectively effecting a lesser and a greater delay than said reference delay means, said timing means comprising pulse generating means time synchronized with the rotation of said rotating antenna means, first gating means connected between said oscillation source and said delay means, second gating means connected between the outputs of said delay means and signal amplifying means, third gating means connected between the output from said amplifying means and each of said fixed and rotating antenna means, said pulse generating means being adapted to generate a plurality of gating pulses, means connecting said gating pulses to predetermined ones of said gating means to affect said transmission sequence.

14. A navigation system as defined in claim 13 wherein said transmitter further comprises means connected to said amplifying means to amplitude modulate the output therefrom in accordance with an information defining signal; and said receiving station further comprising means to amplitude demodulate the received signal and recover therefrom said information defining signal.

15. A navigation system as defined in claim 14 wherein said rotating antenna means comprises a single antenna displaced less than one-half wave length at the operating frequency from said fixed antenna means and wherein said third transmission interval is comprised of alternate transmissions from each of said fixed and said rotating antennas.

16. A navigation system as defined in claim 14 wherein said rotating antenna means comprises a pair of antennas oppositely disposed from said fixed antenna at equal radii of less than one-quarter wave length at the operating frequency, and wherein said third transmission interval is comprised of alternate transmissions from each of said pair of rotating antennas.

17. A navigation system as defined in claim 1 wherein a transmission sequence is effected M times during N revolutions of said rotating antenna means about said fixed antenna means and each of the second transmission intervals of successive ones of said transmission sequences is defined as a discretely different permutation of advanced and retarded phase signal transmissions, each said successive second transmission interval being completed at a predetermined rotational position of said rotating antenna means with respect to said fixed antenna means so as to define a reference azimuth, said receiver logic means including means to start said counter at one of 2M counts corresponding to those azimuths leading and lagging each of said M reference azimuths by 90°, whereby said counter is adapted to count to the azimuth of said receiving station from said transmitter site M times during each N revolutions of said rotating antenna means with each of said M counts starting from one of said 2M counts as aforedescribed.

18. A navigation system as defined in claim 1 wherein said first transmission interval is defined as successive alternate transmissions from said fixed antenna means of signals the phases of which are respectively advanced and retarded with respect to a reference phase.

19. A navigation system as defined in claim 1 wherein said first transmission interval is defined as a continuous wave transmission from said fixed antenna means of a signal having said reference phase.

20. A navigation system as defined in claim 1 wherein said first transmission interval is defined as a predetermined pattern of successive transmissions from said fixed antenna means of signals having phases advanced and retarded with respect to a reference phase with the average phase of said pattern being equal to said reference phase.

References Cited by the Examiner
UNITED STATES PATENTS

| | | | |
|---|---|---|---|
| 2,686,910 | 8/1954 | Hirsch | 343—106 X |
| 3,181,159 | 4/1965 | Kramar et al. | 343—106 X |
| 3,195,132 | 7/1965 | Battle et al. | 343—106 |
| 3,195,134 | 7/1965 | Steiner | 343—106 |

CHESTER L. JUSTUS, *Primary Examiner.*

H. C. WAMSLEY, *Assistant Examiner.*